(12) United States Patent
Sprague et al.

(10) Patent No.: US 10,024,338 B2
(45) Date of Patent: Jul. 17, 2018

(54) METHOD AND APPARATUS FOR A BWR JET PUMP INLET MIXER COMPLIANT STOP

(75) Inventors: Robin D. Sprague, Wilmington, NC (US); Bruce J. Lentner, Wilmington, NC (US); Emanuel Klein, Wilmington, NC (US); David B. Drendel, San Jose, CA (US); Bret E. Nelson, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1949 days.

(21) Appl. No.: 13/106,420

(22) Filed: May 12, 2011

(65) Prior Publication Data

US 2012/0288053 A1 Nov. 15, 2012

(51) Int. Cl.
  *G21C 15/25* (2006.01)
  *F04F 5/54* (2006.01)
  *G21C 13/02* (2006.01)

(52) U.S. Cl.
  CPC .............. *F04F 5/54* (2013.01); *G21C 13/02* (2013.01); *G21C 15/25* (2013.01); *Y02E 30/31* (2013.01); *Y10T 29/49826* (2015.01)

(58) Field of Classification Search
  CPC ..................................................... G21C 15/25
  (Continued)

(56) References Cited

U.S. PATENT DOCUMENTS 3,618,994 A * 11/1971 Gepfert et al. ................. 403/71
4,413,432 A    11/1983 Bierwith
(Continued)

FOREIGN PATENT DOCUMENTS

| EP | 1 022 747 A1 | 7/2000 |
| JP | S57196871 U | 12/1982 |
| JP | S6152481 A | 3/1986 |
| JP | H0545212 U | 6/1993 |
| JP | 2003-161795 | 6/2003 |
| JP | 2008107345 A | 5/2008 |

OTHER PUBLICATIONS

U.S. Office Action dated Jun. 13, 2013 for co-pending U.S. Appl. No. 12/980,010.
(Continued)

*Primary Examiner* — Jack W Keith
*Assistant Examiner* — Daniel Wasil
(74) *Attorney, Agent, or Firm* — Harness, Dickey & Pierce, P.L.C.

(57) ABSTRACT

A method and apparatus for a boiling water reactor (BWR) jet pump inlet mixer compliant stop. The inlet mixer compliant stop may be installed in a pocket area between a riser pipe and an inlet mixer of a BWR jet pump assembly. The inlet mixer compliant stop includes a main body and a foot that are separated via the tightening of one or more jacking bolts used to connect the main body and the foot. A cold spring attached to the main body provides a lateral force that is imparted on the inlet mixer, to force the inlet mixer away from a centerline of the riser pipe. A precise lateral force may be imparted on the inlet mixer by gauging a width of a gap between opposing bosses on a front face of the main body and a distal end of the cold spring. The inlet mixer compliant stop imparts a greater lateral force on the inlet mixer as the jacking bolts are tightened, further separating the main body from the foot, as the gap between the opposing bosses is reduced.

11 Claims, 21 Drawing Sheets

(58) Field of Classification Search
USPC .................. 376/285, 372, 407, 392; 29/428
See application file for complete search history.

(56) References Cited

U.S. PATENT DOCUMENTS

| | | | | |
|---|---|---|---|---|
| 4,468,172 | A * | 8/1984 | Dixon et al. | 376/407 |
| 4,499,691 | A | 2/1985 | Karazim et al. | |
| 4,576,356 | A * | 3/1986 | Kucera | 248/559 |
| 4,675,149 | A | 6/1987 | Perry et al. | |
| 5,308,032 | A * | 5/1994 | Ohta | 248/230.2 |
| 5,438,774 | A | 8/1995 | Fletcher et al. | |
| 5,465,512 | A | 11/1995 | Livesay et al. | |
| 5,558,456 | A | 9/1996 | Nakase et al. | |
| 5,683,216 | A * | 11/1997 | Erbes | 411/120 |
| 5,978,433 | A * | 11/1999 | Erbes et al. | 376/372 |
| 6,052,425 | A | 4/2000 | Erbes et al. | |
| 6,158,104 | A * | 12/2000 | Roberts et al. | 29/446 |
| 6,234,541 | B1 | 5/2001 | Wagner et al. | |
| 6,320,923 | B2 | 11/2001 | Wivagg et al. | |
| 6,394,765 | B1 * | 5/2002 | Erbes et al. | 417/360 |
| 6,435,839 | B1 * | 8/2002 | Erbes | 417/63 |
| 6,463,114 | B1 * | 10/2002 | Wivagg | 376/285 |
| 6,490,331 | B2 | 12/2002 | Erbes | |
| 6,788,756 | B2 | 9/2004 | Erbes | |
| 6,857,814 | B2 | 2/2005 | Jensen | |
| 7,185,798 | B2 * | 3/2007 | Butler | 228/44.5 |
| 7,272,204 | B2 | 9/2007 | Jensen | |
| 7,596,200 | B2 | 9/2009 | Jensen | |
| 7,627,074 | B2 | 12/2009 | Erbes et al. | |
| 8,077,823 | B2 | 12/2011 | Baversten et al. | |
| 8,170,174 | B1 | 5/2012 | Lentner et al. | |
| 8,210,491 | B2 * | 7/2012 | Matsumoto et al. | 403/188 |
| 8,548,114 | B2 * | 10/2013 | Jensen | 376/372 |
| 8,550,791 | B2 * | 10/2013 | DeFilippis et al. | 376/372 |
| 8,731,134 | B2 * | 5/2014 | DeFilippis et al. | 376/372 |
| 2001/0001009 | A1 | 5/2001 | Wivagg et al. | |
| 2003/0177627 | A1 * | 9/2003 | Richardson | 29/428 |
| 2004/0223815 | A1 | 11/2004 | Stankus et al. | |
| 2005/0247754 | A1 | 11/2005 | Butler | |
| 2005/0271182 | A1 * | 12/2005 | Somerville | 376/260 |
| 2007/0189434 | A1 * | 8/2007 | Jensen | 376/260 |
| 2007/0275341 | A1 * | 11/2007 | Hanks | 433/7 |
| 2010/0098206 | A1 * | 4/2010 | Baversten et al. | 376/289 |
| 2010/0316180 | A1 | 12/2010 | Lentner et al. | |
| 2011/0135049 | A1 * | 6/2011 | Wroblewski et al. | 376/372 |
| 2011/0176938 | A1 * | 7/2011 | DeFilippis et al. | 417/151 |
| 2011/0280360 | A1 * | 11/2011 | Flanigan et al. | 376/372 |
| 2012/0032064 | A1 * | 2/2012 | Defilippis et al. | 248/675 |
| 2012/0155598 | A1 * | 6/2012 | Lentner et al. | 376/392 |
| 2012/0163527 | A1 * | 6/2012 | Sprague et al. | 376/372 |

OTHER PUBLICATIONS

Notification from the Spanish Patent Office dated Nov. 11, 2013 for Spanish Application 201132115.
Office Action issued in SE Application No. 1151236-5.
The unofficial English translation of ES Office Action issued in connection with corresponding ES Patent Application No. 201230723 dated Dec. 10, 2013.
Unofficial English translation of JP Office Action dated Apr. 15, 2014 issued in connection with corresponding JP Patent Application No. 2012-108070.
Office Action in corresponding Mexican Patent Application MX/a/2012/005549, dated Jan. 19, 2017.

* cited by examiner

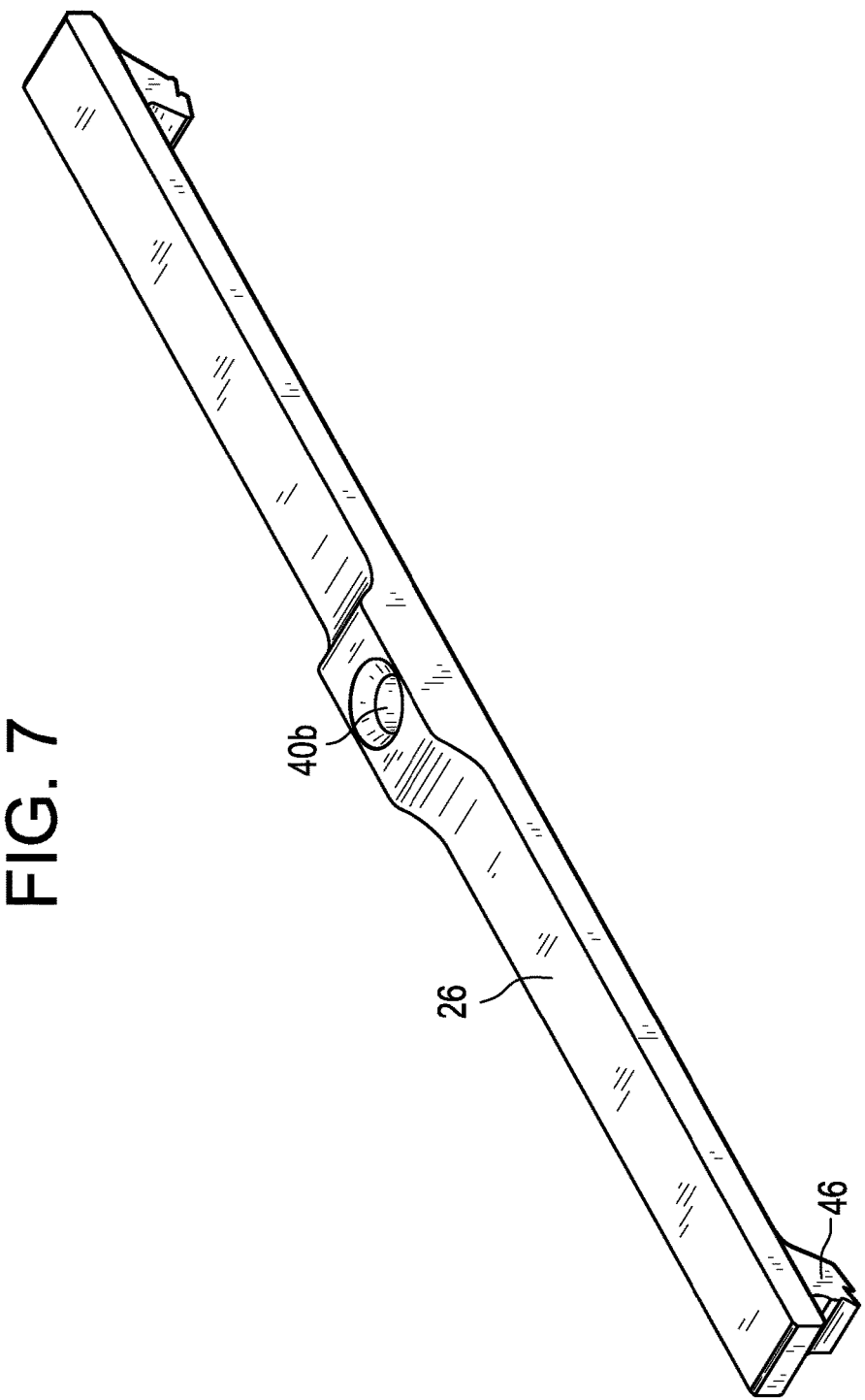

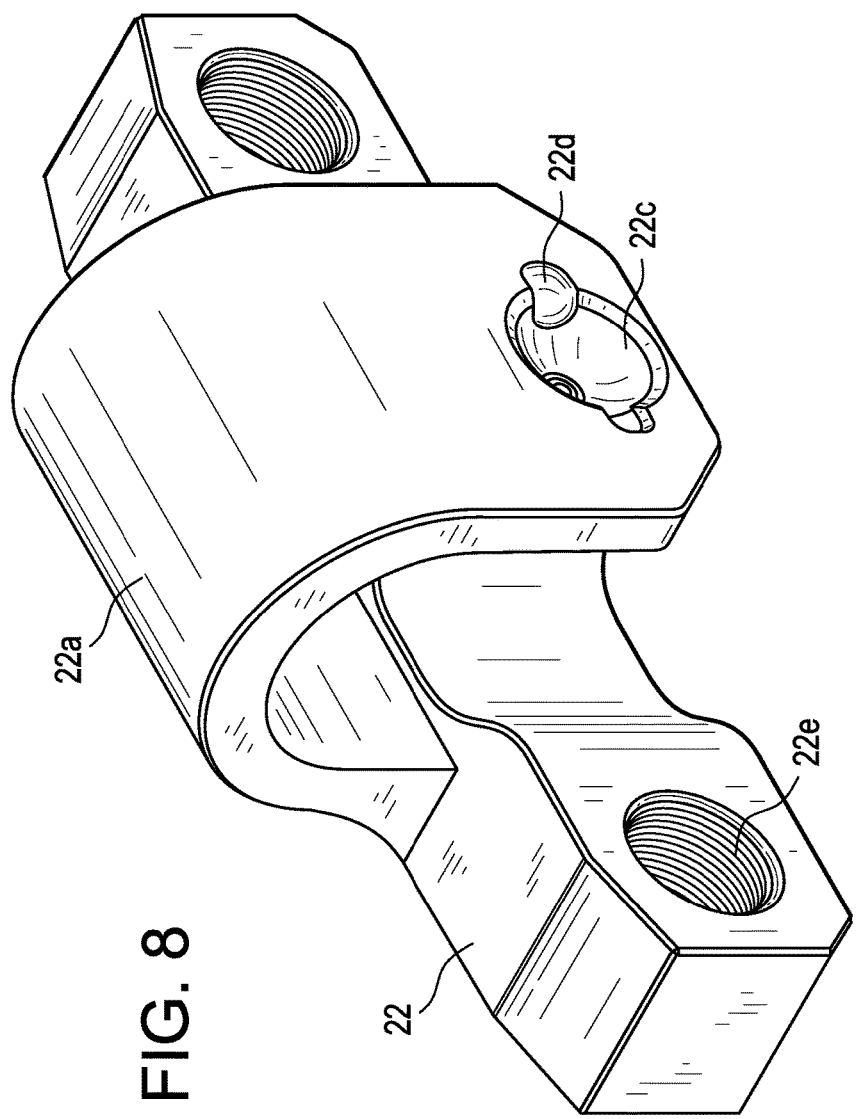

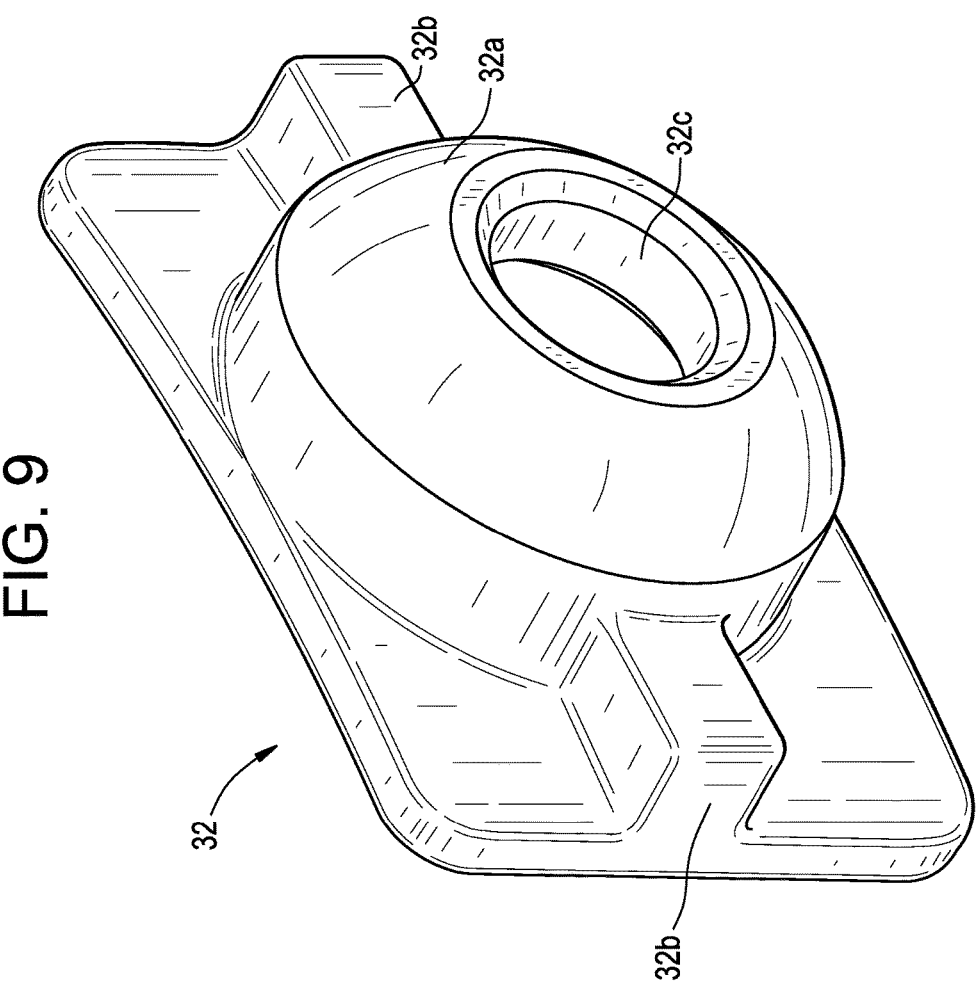

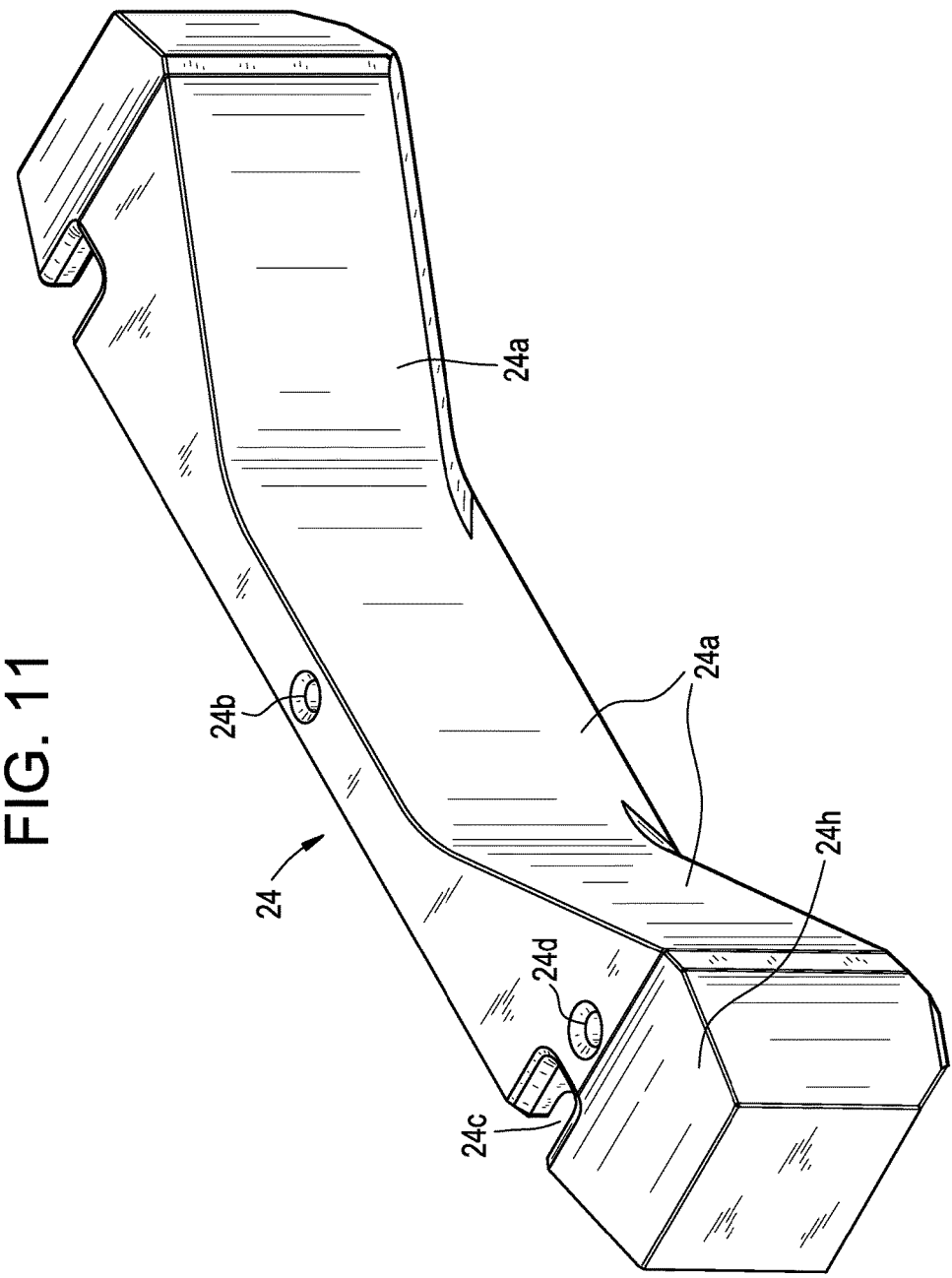

2

METHOD AND APPARATUS FOR A BWR JET PUMP INLET MIXER COMPLIANT STOP

BACKGROUND OF THE INVENTION

Field of the Invention

Example embodiments relate generally to nuclear reactors, and more particularly to a method and apparatus for a Boiling Water Reactor (BWR) jet pump inlet mixer compliant stop clamp assembly that applies a controlled lateral force to an inlet mixer.

Related Art

A reactor pressure vessel (RPV) of a boiling water reactor (BWR) typically has a generally cylindrical shape and is closed at both ends (for example by a bottom head and a removable top head). A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and supported against two opposing rigid contacts within jet pump restrainer brackets by a gravity actuated wedge.

Conventionally, set screw gaps may be formed by movement of either the main wedge or the inlet mixer. Additionally, vibration may cause wear of the main wedge and/or set screws. Set screw gaps allow the inlet mixer to experience flow induced vibration (FIV), causing excessive wear to jet pump components. Furthermore, the conventional jet pump assembly may also experience slip joint leakage (i.e., leakage between the mechanical connection of the inlet mixer and diffuser).

SUMMARY OF INVENTION

Example embodiments provide a method and an apparatus for a BWR jet pump inlet mixer compliant stop that may apply a controlled, reduced horizontal force to the side of the inlet mixer to stabilize the inlet mixer. The inlet mixer compliant stop, in conjunction with two other non-compliant stops, may provide a three-point contact to mitigate inlet mixer flow induced vibration (FIV) and slip joint leakage. The three-point contact may be used along with an existing (i.e., conventional) main wedge and set screws, or it may be used in lieu of an existing main wedge and set screws (i.e., an existing main wedge and/or existing set screws may be removed).

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 7 is a detailed view of a ratchet keeper of a jet pump inlet mixer compliant stop, in accordance with an example embodiment of the invention;

FIG. 8 is a detailed view of a main body of a jet pump inlet mixer compliant stop, in accordance with an example embodiment of the invention;

FIG. 9 is a rear view of a swivel contact pad of a jet pump inlet mixer compliant stop, in accordance with an example embodiment of the invention;

FIG. 11 is a rear view of a foot of a jet pump inlet mixer compliant stop, in accordance with an example embodiment of the invention;

DETAILED DESCRIPTION

Figure 1:
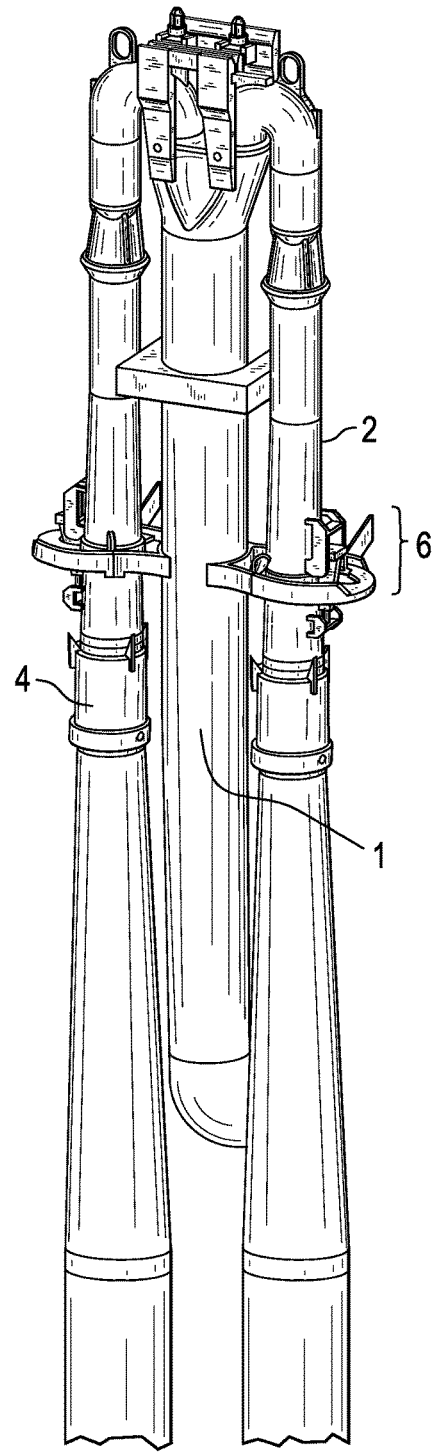
FIG. 1 is a perspective view of a conventional boiling water nuclear reactor (BWR) jet pump assembly.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a perspective view of a conventional boiling water nuclear reactor (BWR) jet pump assembly. The jet pump assembly includes a large riser pipe 1 between two inlet mixers 2. The inlet mixers 2 inject water into diffusers 4. A restrainer bracket assembly 6 may be used to conventionally restrain movement and vibration of the inlet mixers 2. The restrainer bracket assembly 6 may also be used to conventionally mitigate slip joint leakage that occurs between the interface of the inlet mixers 2 and diffusers 4.

Figure 2:
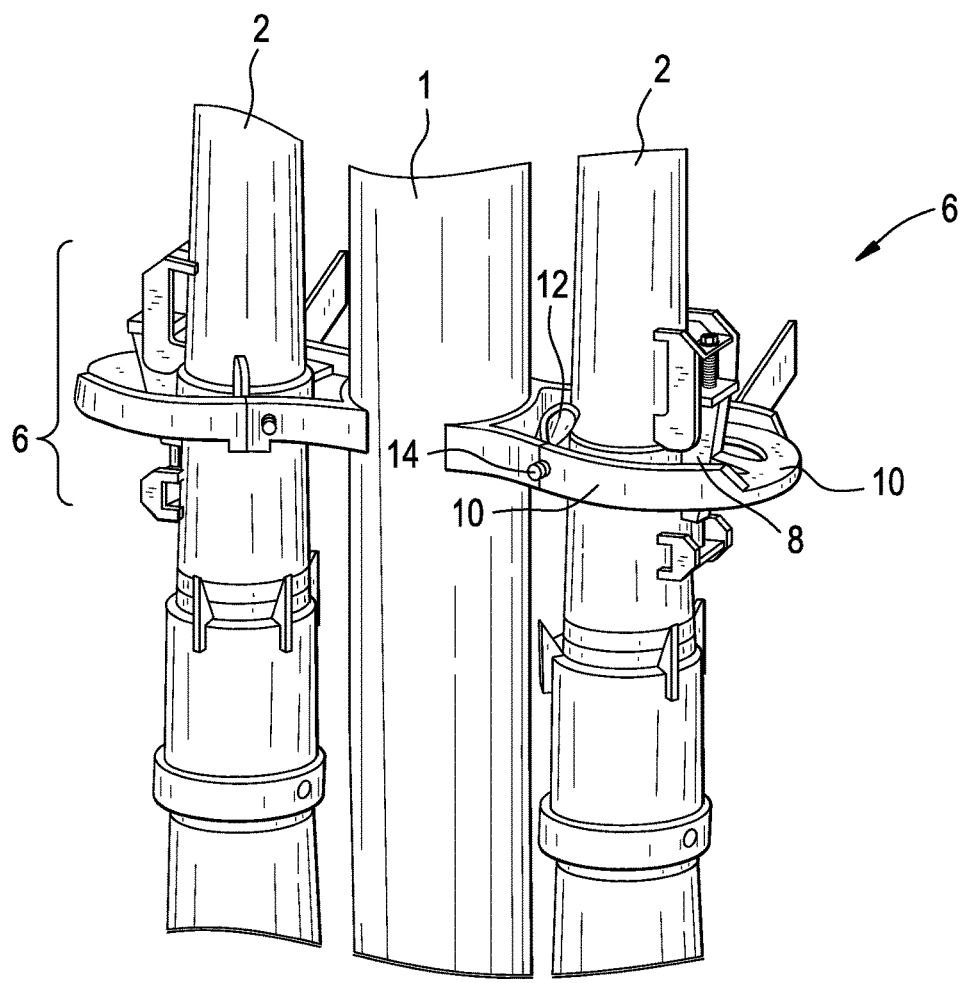
FIG. 2 is an enlarged view of a conventional BWR jet pump restrainer bracket assembly.
Figure 5:
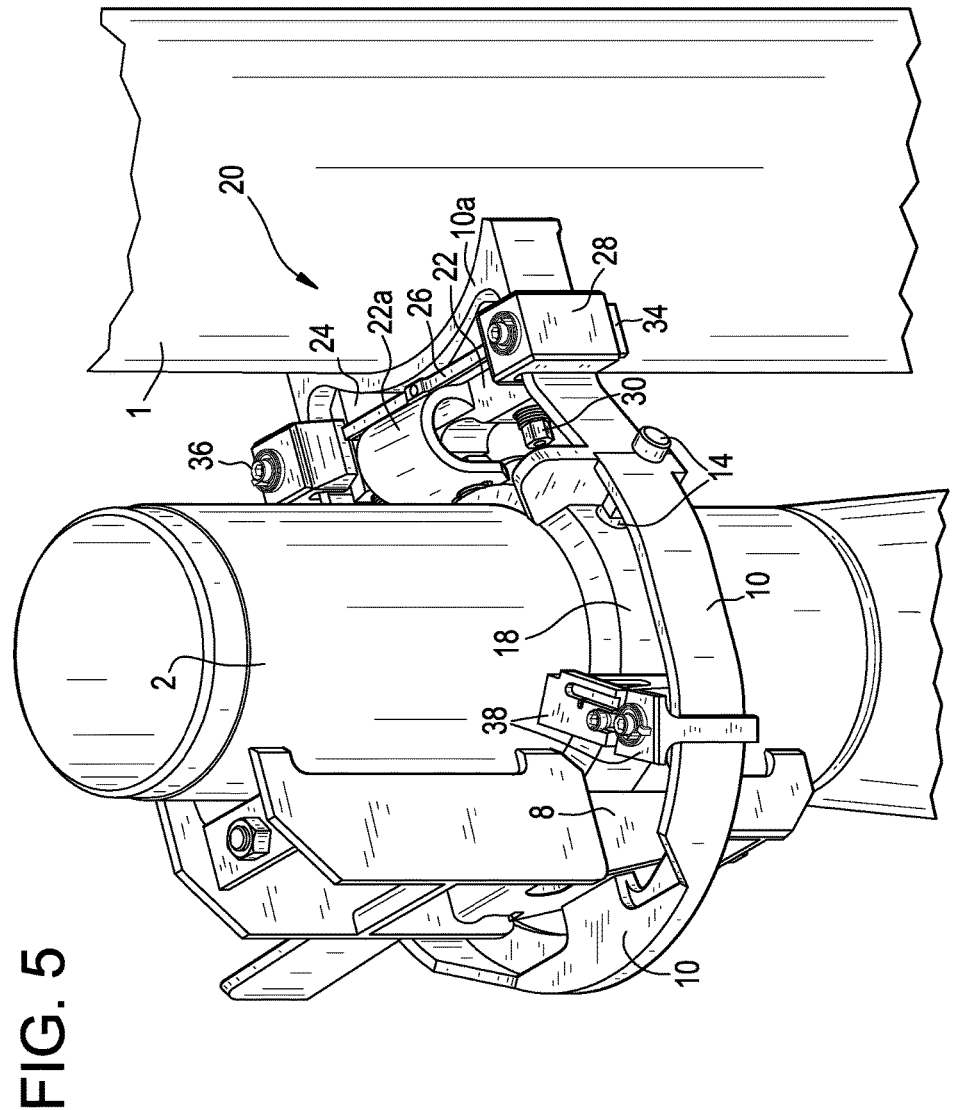
FIG. 5 is a detailed view of a jet pump inlet mixer compliant stop installed on a BWR restrainer bracket assembly, in accordance with an example embodiment of the invention.
Figure 5A:
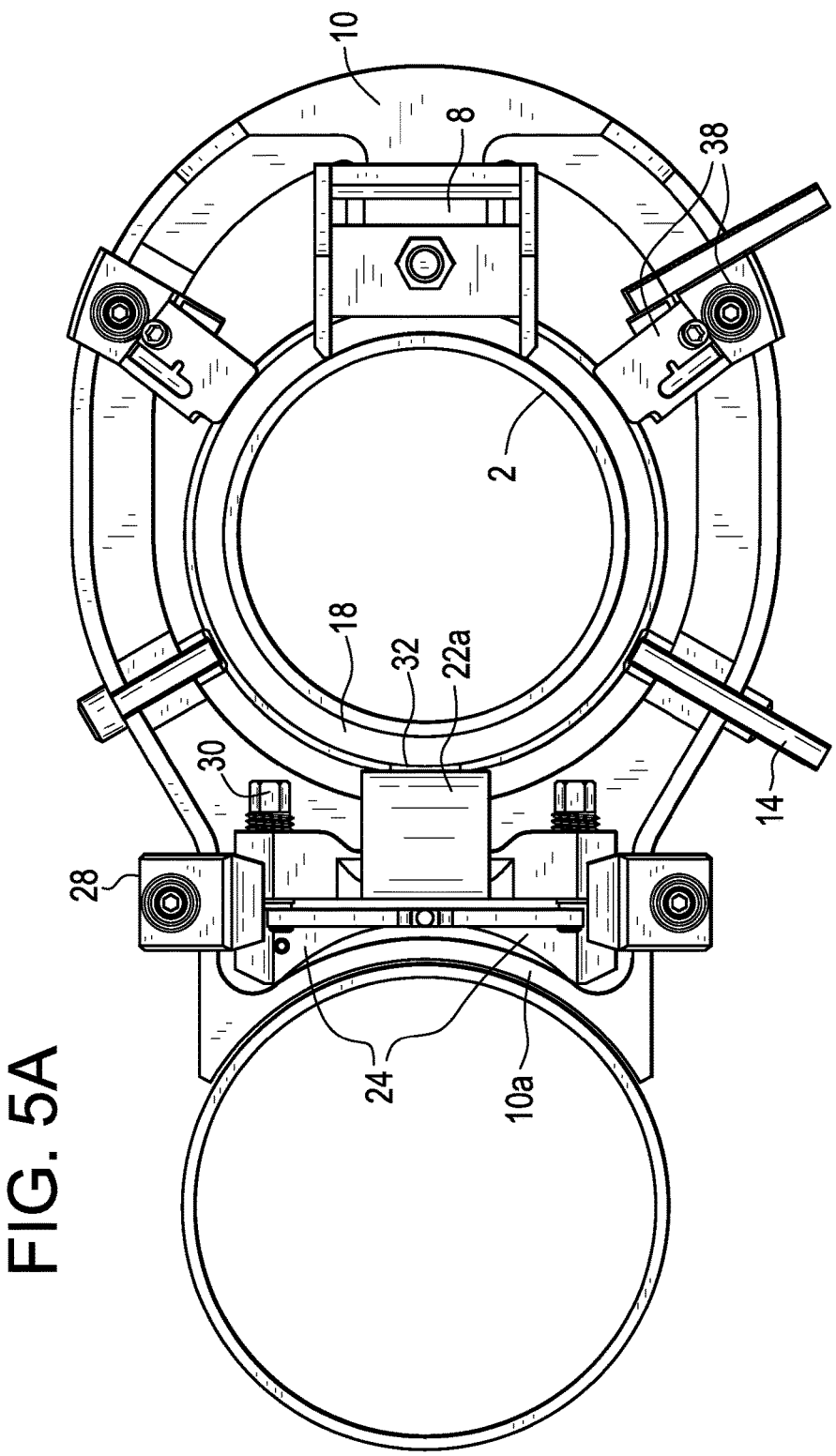
FIG. 5A is a top view of the jet pump inlet mixer compliant stop installed on a BWR restrainer bracket assembly (shown in FIG. 5), in accordance with an example embodiment of the invention.

FIG. 2 is an enlarged view of a conventional BWR jet pump restrainer bracket assembly 6. The conventional restrainer bracket assembly 6 generally includes a restrainer bracket encircling the inlet mixer and pressing against a side wall of the riser pipe 1. The restrainer bracket provides three points of contact for each inlet mixer 2 via a main wedge 8 and two set screws 14 (see FIG. 5A, showing the position of the two set screws 14 for each inlet mixer 2). Guide ears 12 vertically project from the restrainer bracket 10 at the location of each set screw 14.

Figure 3:
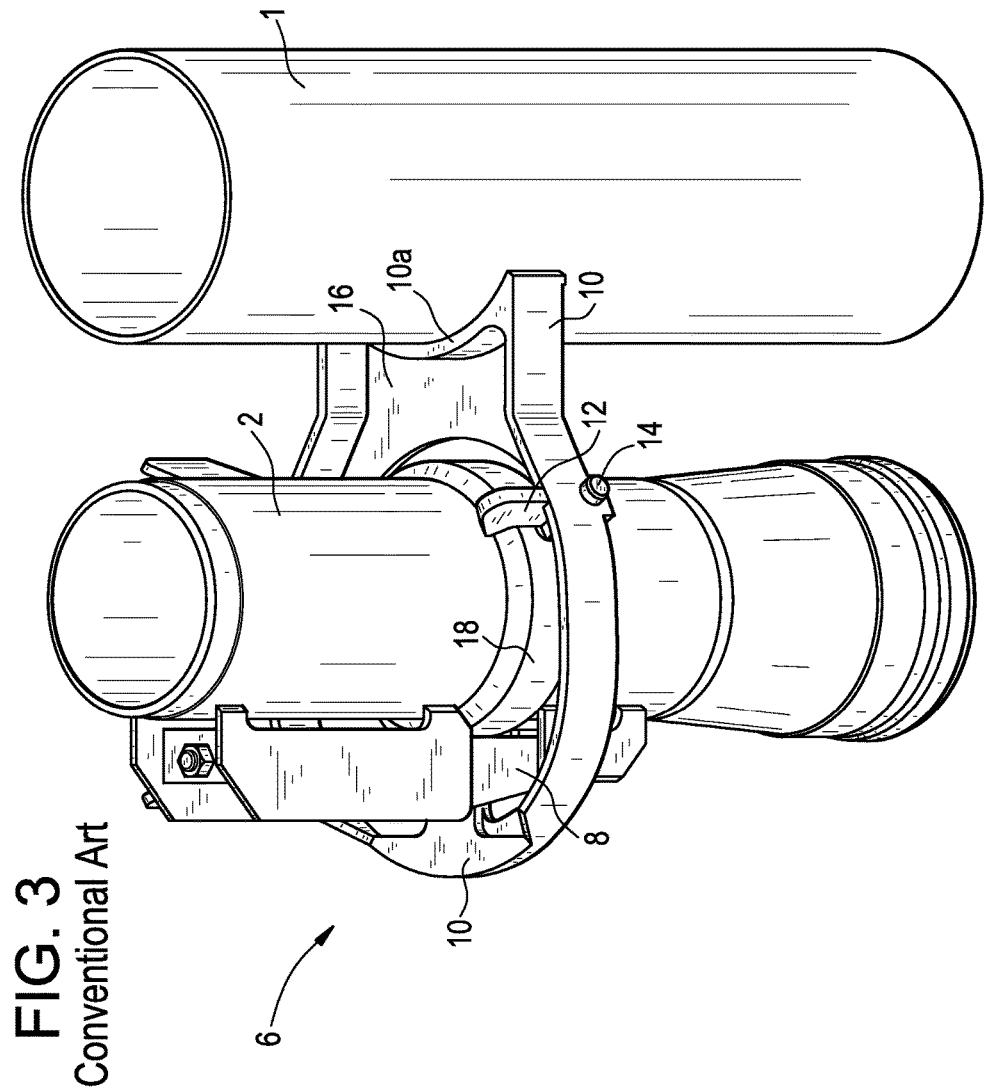
FIG. 3 is an enlarged, side view of a conventional BWR jet pump assembly restrainer bracket assembly.

FIG. 3 is an enlarged, side view of a conventional BWR jet pump assembly restrainer bracket assembly 6. Note that set screws 14 contact a belly band 18 encircling the inlet mixer 2 (also shown in FIG. 5A). Restrainer bracket contoured wall 10a hugs a side wall of riser pipe 1. Conventionally, a pocket 16 exists between riser pipe 1 and inlet mixer 2 (more particularly, the pocket 16 exists between contoured wall 10a of restrainer bracket 10 and belly band 18).

Figure 4:
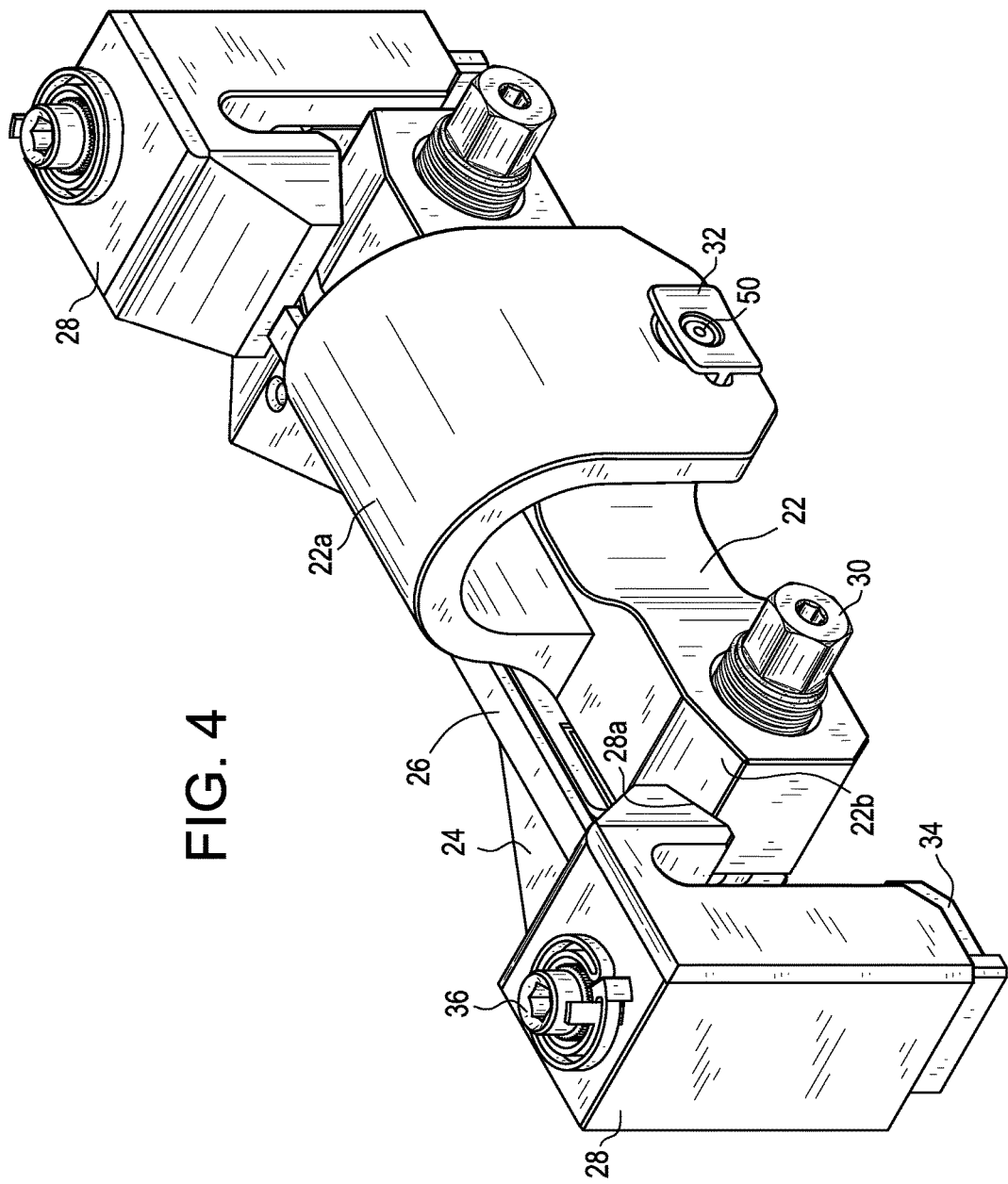
FIG. 4 is a detailed view of a jet pump inlet mixer compliant stop, in accordance with an example embodiment of the invention.

FIG. 4 is a detailed view of a jet pump inlet mixer compliant stop 20, in accordance with an example embodiment of the invention. The compliant stop 20 may include a main body 22 bracketed by two C-clamp frames 28. A foot 24 may be provided to extend longitudinally across a rear surface of the main body 22 (shown in more detail in FIG. 4A). Main body 22 may include an arced cold spring 22a structure attached to the main body 22. The cold spring 22a may be located toward a mid-section of the main body 22 and may project beyond a front surface of the main body 22. The cold spring 22a may include a swivel contact pad 32 attached to a distal end of the cold spring 22a. The swivel contact pad 32 may be held on the distal end of the cold spring 22a by a shoulder screw 50. At least one jacking bolt 30 may run through main body 22 and foot 24 (shown in better detail in FIGS. 6 and 15). Preferably, one jacking bolt 30 may be located on either side of cold spring 22a. Threads on the jacking bolts 30 may mate with threaded connections in the main body, allowing a tightening of the jacking bolts 30 to separate foot 24 from main body 22 (as described herein, in more detail). Ratchet keeper 26 may be included on a top surface of foot 24 (shown in better detail in FIG. 6A).

C-clamps on either end of main body 22 may include an outer C-clamp frame 28 and an inner C-clamp body 34. The C-clamp body 34 may be held in place in the C-clamp frame 28 via socket head cap screws 36 (explained in more detail, herein). Note that a sloped face 28a of C-clamp frame 28 contacts a sloped face 22b of main body 22, providing both vertical and horizontal stabilization of the main body 22 between the two C-clamps (as described in more detail, herein). The angle of the slope may be a moderate angle from a horizontal plane (the horizontal plane may be the flat top surface of the main body 22 or the foot 24), such as a 17 degree slope, for instance.

Figure 4A:
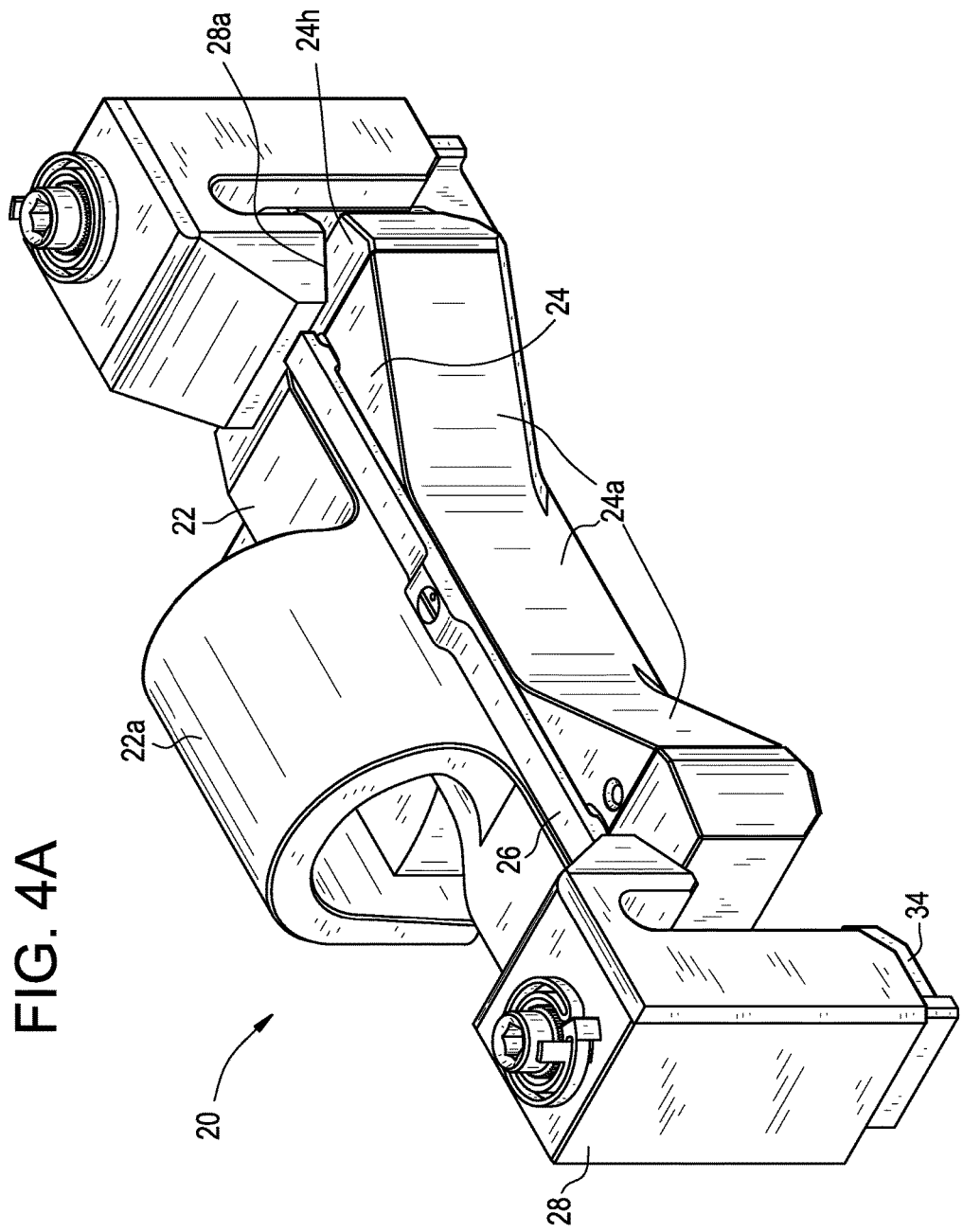
FIG. 4A is a rear view of the jet pump inlet mixer compliant stop of FIG. 4, in accordance with an example embodiment of the invention.

FIG. 4A is a rear view of the jet pump inlet mixer compliant stop 20 of FIG. 4, in accordance with an example embodiment of the invention. FIG. 4A shows the ratchet keeper 26 extending along a top surface of foot 24 (the purpose of the ratchet keeper 26 described, herein). FIG. 4A also shows a shape of an inner surface 24a of foot 24 that may cause foot 24 to somewhat follow a shape of contoured wall 10a of the restrainer bracket 10, as shown in FIG. 5. A sloped face 24h may also be provided on foot 24, allowing sloped face 28a of C-clamp frame 28 to provide both vertical and horizontal stabilization for foot 24 (similar to the way in which the sloped face 28a of C-clamp frame 28 also engages sloped face 22b of main body 22, shown in FIG. 4). The sloped face 24h of foot 24 may be a moderate angle from a horizontal (similar to the description of FIG. 4), such as 17 degrees.

FIG. 5 is a detailed view of a jet pump inlet mixer compliant stop 20 installed on a BWR restrainer bracket assembly 6, in accordance with an example embodiment of the invention. The C-clamp frames 28 and C-clamp bodies 34 may attach to restrainer bracket 10 and hold the compliant stop 20 in place in pocket 16 (see pocket 16, shown in FIG. 3). Jacking bolts 30 may be used to adjust the force the cold spring 22a applies to belly band 18 of inlet mixer 2. Once the desired force of cold spring 22a is reached by tightening jacking bolts 30 (explained in more detail, herein; see discussion related to FIG. 15, in particular), the jacking bolts 30 may be held in place via ratchet keeper 26. Notice that the general shape of foot 24 generally matches the shape of contoured wall 10a of restrainer bracket 10, so as to fit snuggly within pocket 16.

The jet pump inlet mixer compliant stop 20 may be installed with two non-compliant stops 38 (placement of the additional non-compliant stops 38 are best shown in FIG. 5A) to provide the jet pump inlet mixer compliant stop 20 structure with three points of contact. The jet pump inlet mixer compliant stop 20 may provide a reaction force (i.e., a firm point of contact for the riser pipe 2 to rest against, as compliant stop 20 applies the lateral force on the riser pipe 2) that causes the inlet mixer 2 to shift away from the riser pipe 1, thereby reducing the deleterious impact of set screw gaps (gaps between belly band 18 and set screws 14) that may cause chattering and damage. The lateral force the compliant stop 20 imparts on the riser pipe 2 may be in a direction that is opposite from the force that may be provided by an existing wedge 8. In other words, the lateral force provided by the compliant stop 20 may be additive with the inlet mixer 2 hydraulic loads already experienced by an inlet mixer with a conventional restrainer bracket assembly 6. However, because the lateral force applied by the compliant stop 20 may be in a direction that is opposite the direction of the force created by wedge 8, undesirable motion of the inlet mixer 2 (such as flow induced vibration of the inlet mixer 2) and restrainer bracket assembly 6 components (such as chattering of the gravity wedge 8 and/or set screws 14) may be eliminated, thereby reducing potential damage to component parts. The adjustable feature of hard stops 38 coupled with the lateral force of the compliant stop 20 may provide an accurately controlled preload capable of preventing slip joint flow induced vibration (SJFIV), which may eliminate the need for slip joint clamps or other conventional structure used to mitigate undesired component vibration.

Optionally, if the non-compliant stops 38 are used, the wedge 8 and/or set screws 14 may be removed. Also, alternatively to using two non-compliant stops 38, the jet pump inlet mixer compliant stop 20 may be used with the existing wedge 8 and set screws 14. The two non-compliant stops 38 may be adjustable hard stops (such as ADJUSTABLE HARD STOPS FOR NUCLEAR REACTOR RESTRAINER BRACKETS AND METHODS OF USING THE SAME, disclosed in U.S. application Ser. No. 12/980,010), and incorporated by reference it its entirety. The non-compliant stops 38 may provide a reaction force on either side of the location of wedge 8. The two non-compliant stops 38 may provide horizontal constraints between the restrainer bracket 10 and the inlet mixer 2, thereby causing the jet pump inlet mixer compliant stop 20 and two non-compliant stops 38 to provide three points of contact that, in essence, may take the place of the three points of contact that may be conventionally provided by the wedge 8 and set screws 14. The two non-compliant stops 38 may also be set screws, or any other structure capable of pushing (or, horizontally constraining) the restrainer bracket 10 away from the inlet mixer 2 and allowing three points of contact that include the jet pump inlet mixer compliant stop 20 as one of the point s of contact.

FIG. 5A is a top view of the jet pump inlet mixer compliant stop 20 installed on a BWR restrainer bracket assembly 6 (shown in FIG. 5), in accordance with an example embodiment of the invention. FIG. 5A shows the swivel contact pad 32 on a distal end of cold spring 22a contacting belly band 18 to place a controlled lateral force on the inlet mixer 2 (i.e., the cold spring 22a may impart the lateral force toward a centerline of the inlet mixer 2 and away from a centerline of the riser pipe 1). FIG. 5A also shows the placement of non-compliant stops 38 that may be used to provide a three-point contact (along with jet pump inlet mixer compliant stop 20) to stabilize movement of the inlet mixer 2. The location of the swivel contact pad 32 contacting the inlet mixer 2 and the locations of non-compliant stops 38 contacting the inlet mixer 2 may be spaced apart such that they are approximately 120 degrees apart from each other on the inlet mixer 2.

Figure 6:
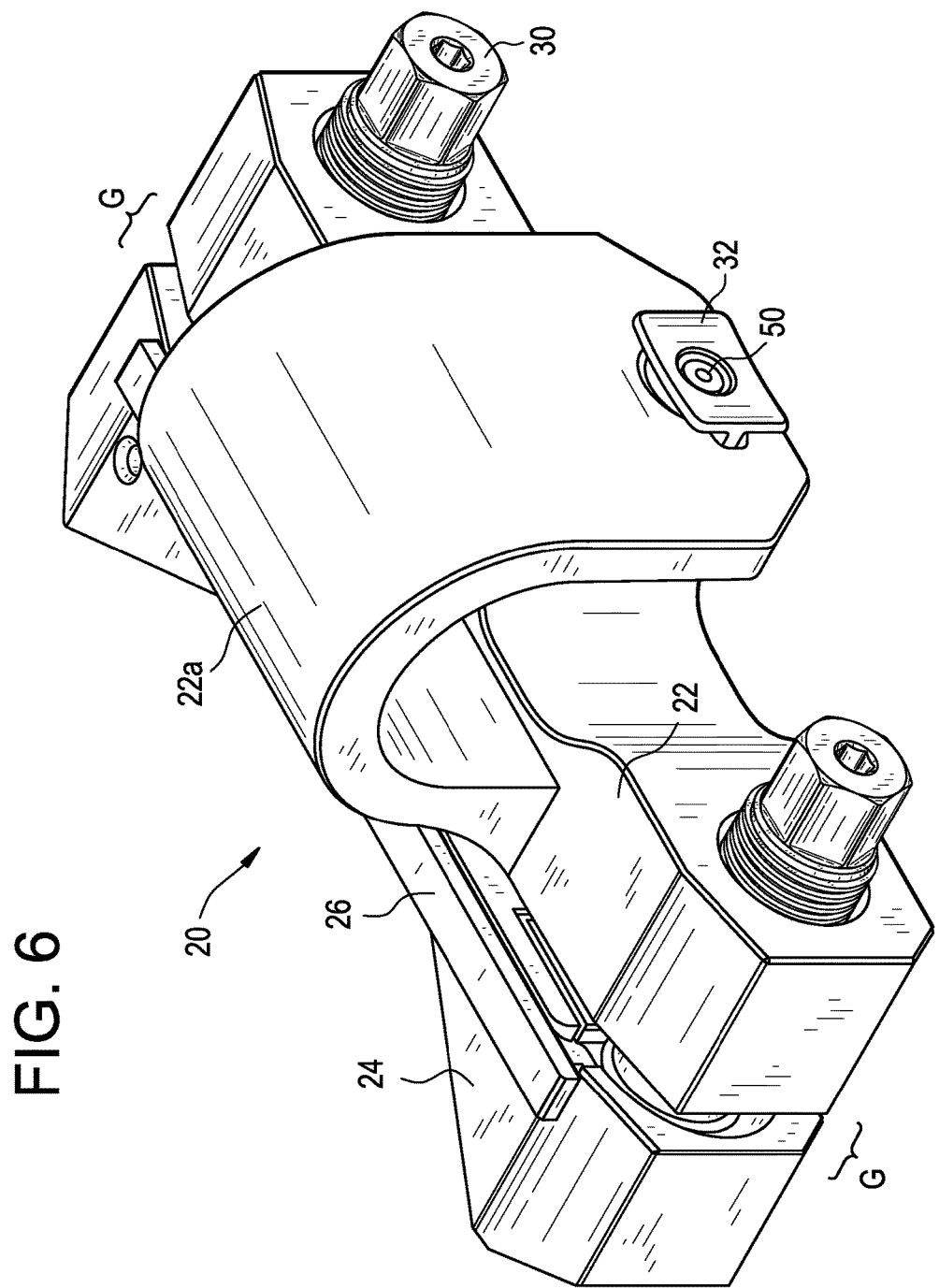
FIG. 6 is a detailed view of a jet pump inlet mixer compliant stop shown without C-clamps, in accordance with an example embodiment of the invention.

FIG. 6 is a detailed view of a jet pump inlet mixer compliant stop 20 shown without C-clamps, in accordance with an example embodiment of the invention. Note that a gap G (also shown in FIG. 15) exists between main body 22 and foot 24. This gap G allows the lateral force that is imparted on inlet mixer 2 (via cold spring 22a) to be finely adjusted through the tightening of jacking bolts 30. Specifically, as jacking bolts 309 are tightened, gap G widens, forcing main body 22 to move apart from foot 24 and then cause compression in cold spring 22a to increase (as swivel contact pad 32 presses up against inlet mixer 2), thereby placing a controlled lateral force on inlet mixer 2.

Figure 6A:
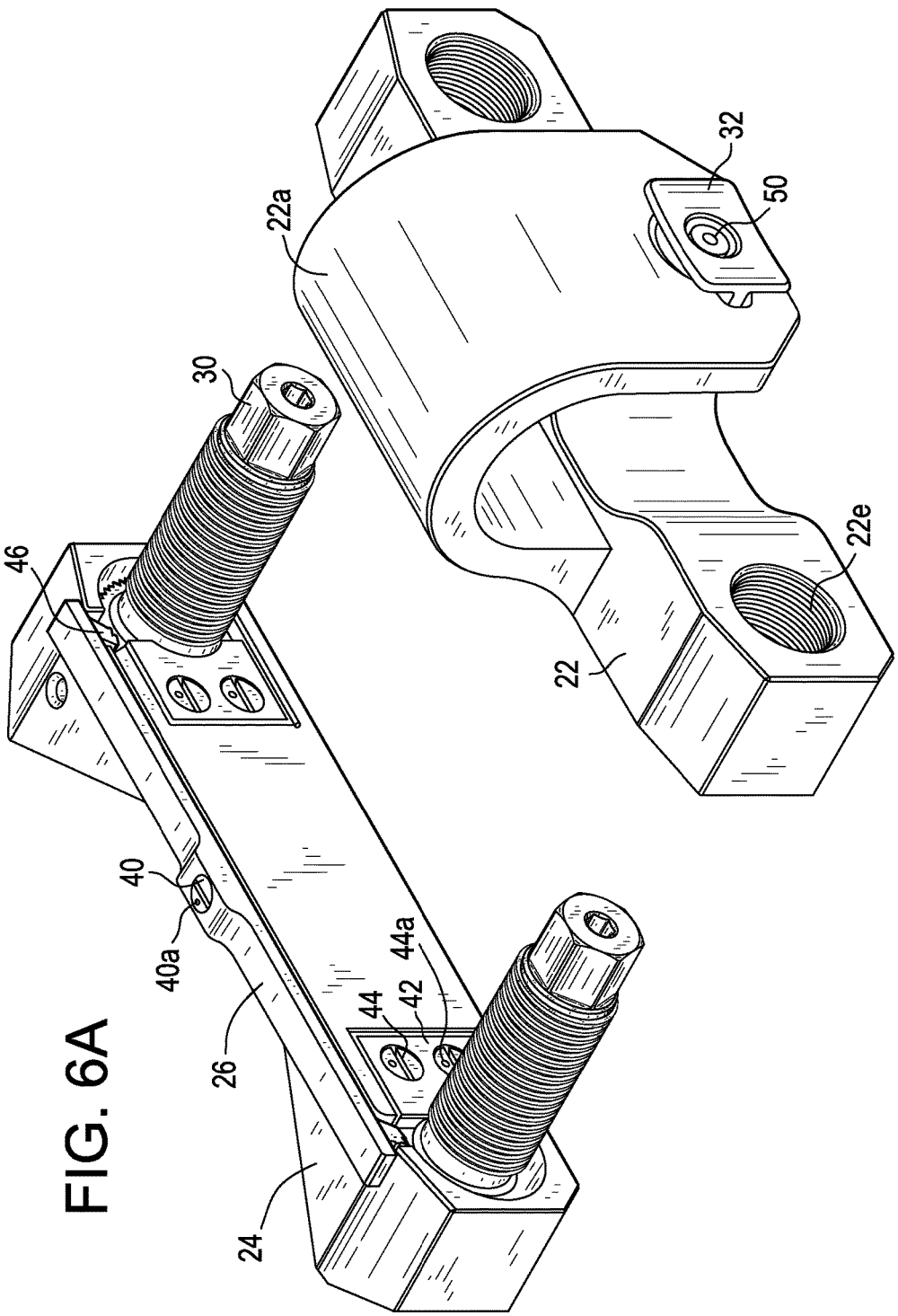
FIG. 6A is an exploded view of the jet pump inlet mixer compliant stop of FIG. 6, in accordance with an example embodiment of the invention.

FIG. 6A is an exploded view of the jet pump inlet mixer compliant stop 20 of FIG. 6, in accordance with an example embodiment of the invention. Jacking bolts 30 are free to rotate within foot 24, as the distal ends of each jacking bolt may be held in place by bolt keeper 42. Bolt keepers 42 may be held in place on foot 24 via flat head screws that may include a retaining pin 44a (retaining pin 44a may be inserted to lock the position of flat head screw 44 into a desired position). As described above, tightening of jacking bolts 30 may cause main body to be forced apart from foot 24 (through the use of threaded connections 22e in main body 22), which ultimately cause compression of cold spring 22a that imparts the lateral force on inlet mixer 2. Jacking bolts 30 may be locked into place via ratchet keeper 26. Specifically, ratchet teeth 46 (on each end of ratchet keeper 26) may engage ratchet teeth 30a (shown in FIG. 13) of the jacking bolts 30, offering anti-rotational structure to hold each jacking bolts in a desired position. Flat head screw 40 may be used to hold ratchet keeper 26 in place on foot 24, and retaining pin 40a may be used to lock flat head screw 40 into place once screw 40 is sufficiently tightened to ensure ratchet keeper 26 is held in place on foot 24.

FIG. 7 is a detailed view of a ratchet keeper 26 of a jet pump inlet mixer compliant stop 20, in accordance with an example embodiment of the invention. Tapped hole 40b may be provided to allow flat head screw 40 to hold ratchet keeper 26 in place on a top surface of foot 24. Note that ratchet teeth 26 may be provided on either end of ratchet keeper 26, for anti-rotational purposes (to ensure that a desired position of jacking bolts 30 may be retained within foot 24).

FIG. 8 is a detailed view of a main body 22 of a jet pump inlet mixer compliant stop 20, in accordance with an example embodiment of the invention. Spherical seat 22c may be provided on an outer surface of the distal end of the cold spring 22a. The spherical seat 22c may accept a convex spherical face 32*a* (shown in FIG. 9) of swivel contact pad 32 to pivot on a distal end of cold spring 22*a*. Concave spherical seat 22*c* allows swivel contact pad 32 to readjust positioning throughout installation of jet pump inlet mixer compliant stop 20, including the point in time when jacking bolts 30 (shown in at least FIG. 6) are being tightened and compression is being placed on cold spring 22*a* (thereby causing some shift and movement of the distal end of cold spring 22*a* which may require minute repositioning of the swivel contact pad 32 throughout this adjustment/installation period). Alignment channels 22*d* may also be provided to capture self-alignment rib 32*b* (shown in FIG. 9) of swivel contact pad 32, to reduce actual rotation of swivel contact pad 32 during remote installation and use of the jet pump inlet mixer compliant stop 20.

FIG. 9 is a rear view of a swivel contact pad 32 of a jet pump inlet mixer compliant stop 20, in accordance with an example embodiment of the invention. Shoulder screw hole 32*c* accepts shoulder screw 50 (shown in at least FIG. 6), to secure swivel contact pad 32 to cold spring 22*a*. As described in relation to FIG. 8 (above), convex spherical face 32*a* allows swivel contact pad 32 to pivot within concave spherical seat 22*c* of FIG. 8. Self-alignment ribs 32*b* align with alignment channels 22*d* (of FIG. 8) to cause swivel contact pad 32 to resist rotation during installation and use.

Figure 10:
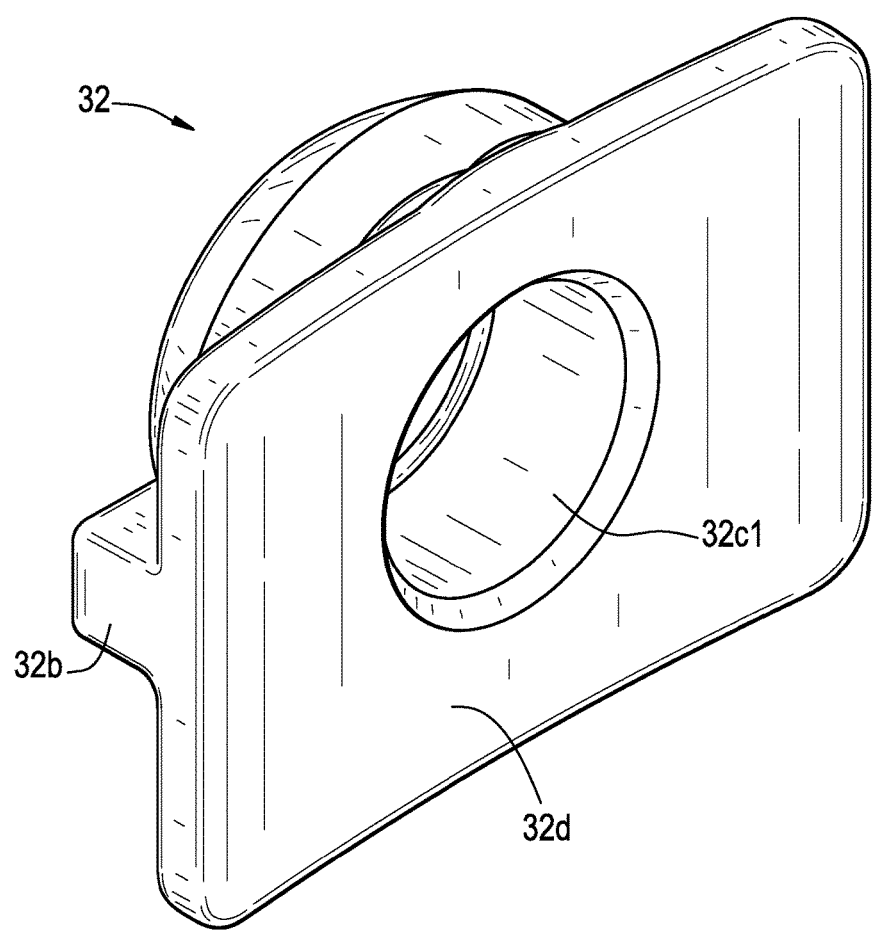
FIG. 10 is a detailed view of the swivel contact pad (shown in FIG. 9) of a jet pump inlet mixer compliant stop, in accordance with an example embodiment of the invention.

FIG. 10 is a detailed view of the swivel contact pad 32 (shown in FIG. 9) of a jet pump inlet mixer compliant stop 20, in accordance with an example embodiment of the invention. Shoulder screw pocket 32*c*1 may accept and retain the head of shoulder screw 50 (shown in at least FIG. 6). Concave cylindrical surface 32*d* may be provided to allow swivel contact pad 32 to conform to an outer rounded surface of belly band 18 of inlet mixer 2.

Figure 11A:
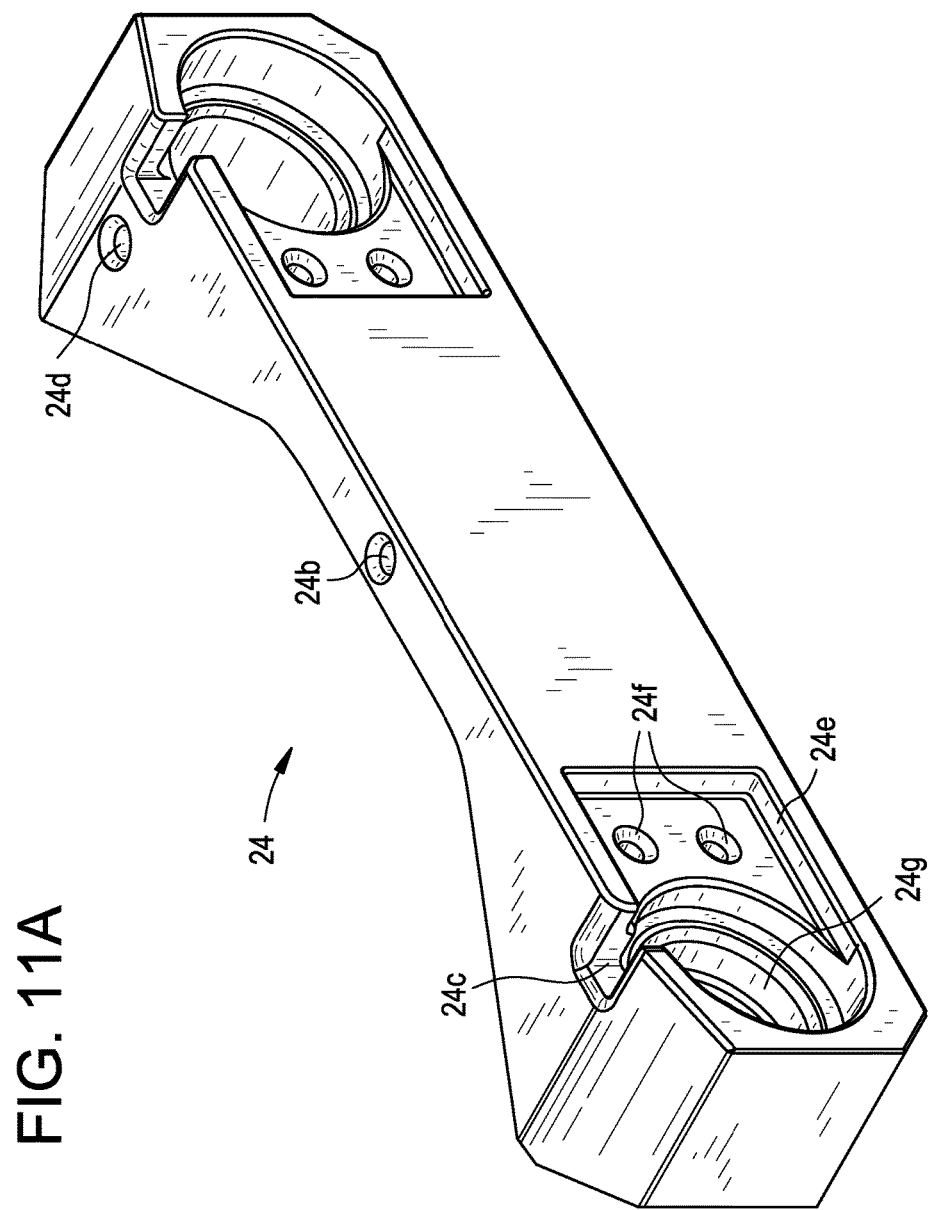
FIG. 11A is a detailed view of the foot (shown in FIG. 11) of a jet pump inlet mixer compliant stop, in accordance with an example embodiment of the invention.

FIG. 11 is a rear view of a foot 24 of a jet pump inlet mixer compliant stop 20, in accordance with an example embodiment of the invention. Tapped hole 24*b* may be provided to accept flat head screw 40 (shown in FIG. 6A). Ratchet teeth slots 24*c* may be provided to accept ratchet teeth 46 of ratchet keeper 26 (also shown in at least FIG. 6A). Inspection port 24*d* may be provided as a way of verifying that spherical pad 48 (shown in FIG. 15) is in place in within jacking bolt retention hole 24*g* (shown in FIG. 11A).

FIG. 11A is a detailed view of the foot 24 (shown in FIG. 11) of a jet pump inlet mixer compliant stop 20, in accordance with an example embodiment of the invention. Pocket 24*e* may be provided to accept bolt keeper 42 (shown in FIG. 6A). Tapped holes 24*f* may be provided to accept flat head screws 44 (also shown in FIG. 6A). As described above, jacking bolt retention holes 24*g* may be provided in a front surface of foot 24 (the surface of the foot facing the main body 22) to allow jacking bolts 30 (shown in FIG. 6A) to freely rotate within foot 24 (bolt keeper 42, shown in FIG. 6A, may be provided simply to retain a distal end of each jacking bolt 30).

Figure 12:
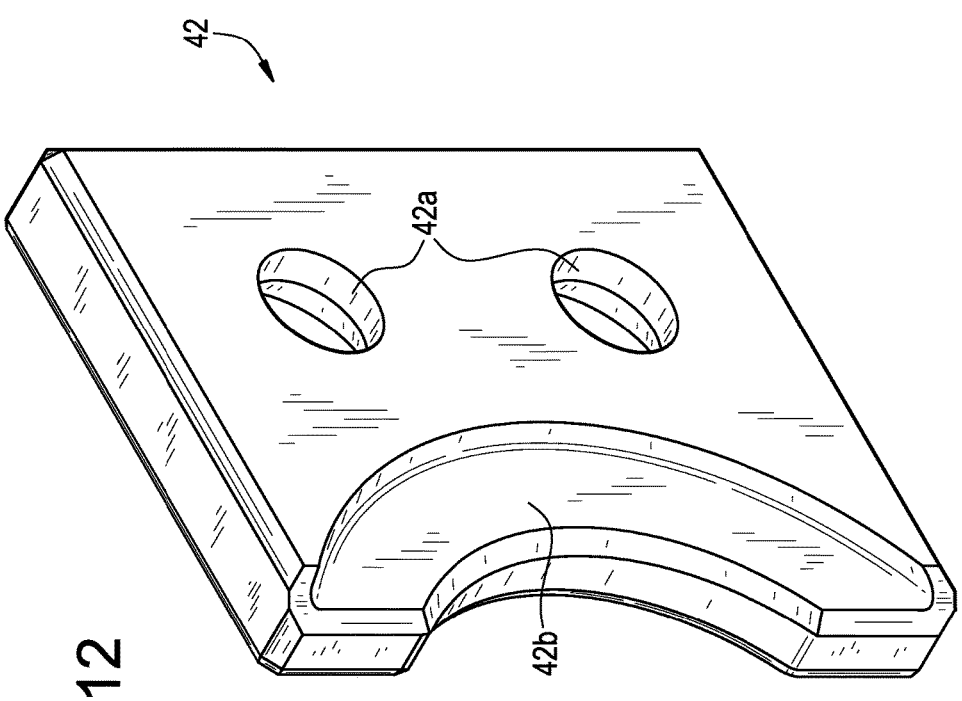
FIG. 12 is a detailed view of a bolt keeper of a jet pump inlet mixer compliant stop, in accordance with an example embodiment of the invention.

FIG. 12 is a detailed view of a bolt keeper 42 of a jet pump inlet mixer compliant stop 20, in accordance with an example embodiment of the invention. Notice the arced portion 42*b* of bolt keeper 42 that hugs the side of jacking bolt 30 (shown in FIG. 6A) and causes a distal end of jacking bolt 30 to be retained within jacking bolt retention hole 24*g* (shown in FIG. 11A). Holes 42*a* may accept flat head screws 44, as shown in FIG. 6A.

Figure 13:
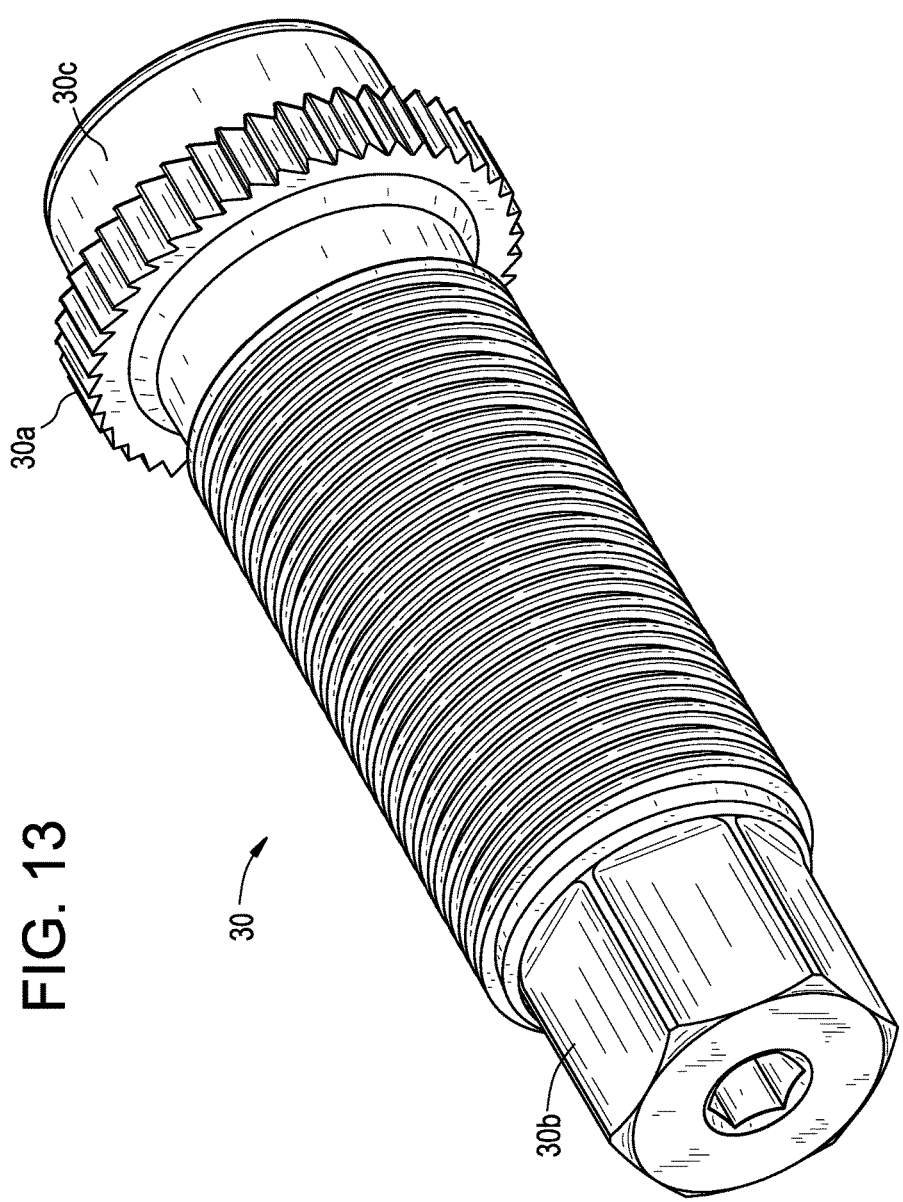
FIG. 13 is a detailed view of a jacking bolt of a jet pump inlet mixer compliant stop, in accordance with an example embodiment of the invention.

FIG. 13 is a detailed view of a jacking bolt 30 of a jet pump inlet mixer compliant stop 20, in accordance with an example embodiment of the invention. Ratchet teeth 30*a* may be provided on jacking bolt 30 to allow the ratchet teeth 46 of ratchet keeper 26 to engage the teeth 30*a* for anti-rotational purposes (as shown in FIG. 6A). Note that ratchet teeth 30*a* are larger than the diameter of the rest of jacking bolt 30, thereby providing a physical stop that allows a distal end 30*c* of jacking bolt 30 to remain within jacking bolt retention hole 24*g* (see FIG. 11A for retention hole 24*g*) of foot 24. Specifically, the arced portion 42*b* (see FIG. 12) of bolt keeper 42 may provide a physical stop that may contact the enlarged diameter of jacking bolt 30 (which includes ratchet teeth 30*a*) to retain the jacking bolt 30 within foot 24, as shown for instance in FIG. 6A. Outer hex 30*b* may also be provided on jacking bolt 30 to apply a necessary torque to jacking bolt 30 to effectively place compression on cold spring 22*a* (as described above, related to the discussion of FIG. 6).

Figure 14:
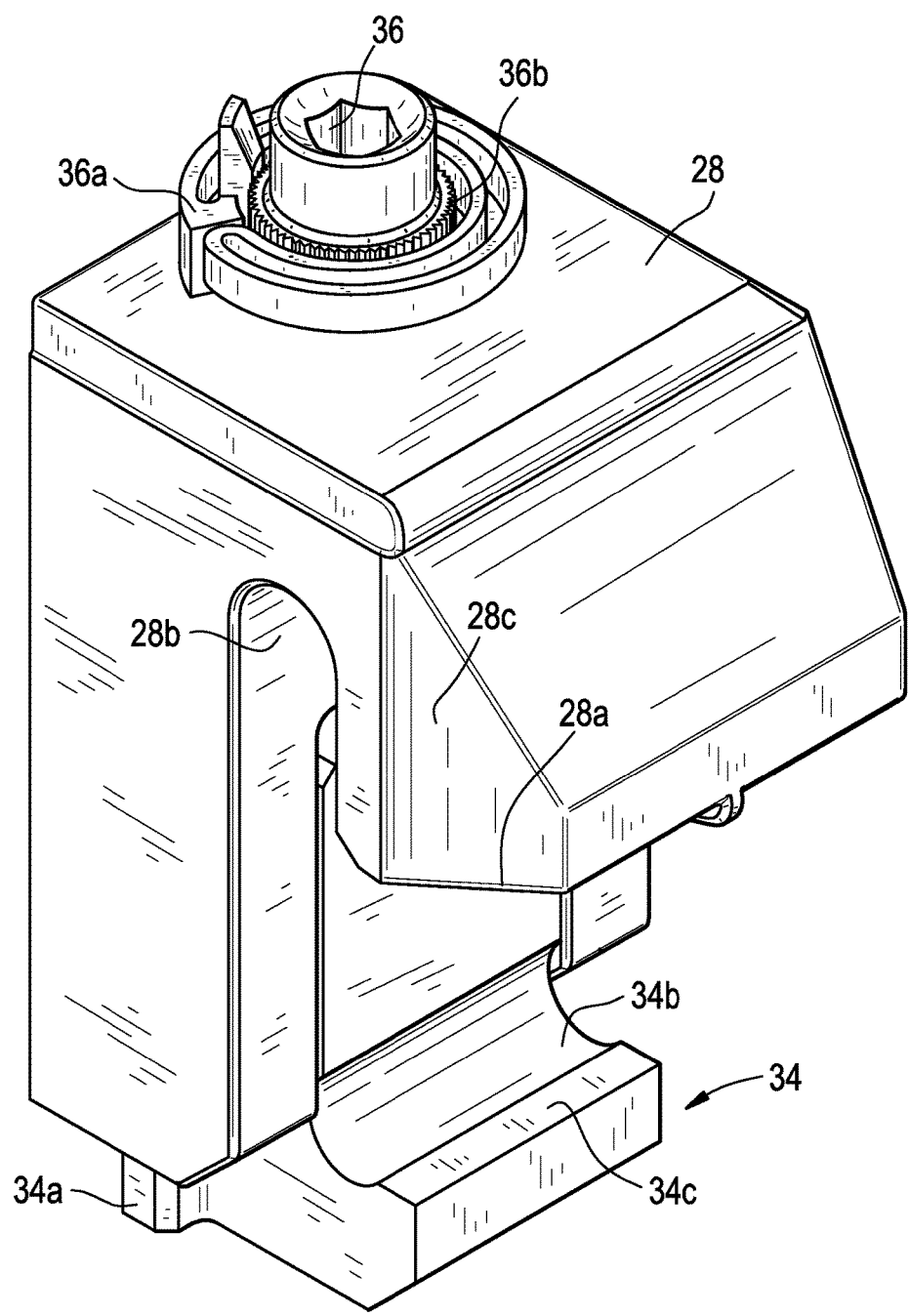
FIG. 14 is a detailed view of a C-clamp of a jet pump inlet mixer compliant stop, in accordance with an example embodiment of the invention.

FIG. 14 is a detailed view of a C-clamp of a jet pump inlet mixer compliant stop 20, in accordance with an example embodiment of the invention. Cavity 28*b* may be provided on C-clamp frame 28 to allow overhang 28*c* to extend over the top of restrainer bracket 10 and contact main body 22. Specifically, sloped face 28*a* of C-clamp frame 28 may contact sloped face 22*b* of main body 22 (as shown in FIG. 4). The sloped nature of sloped faces 28*a* and 22*b* allow the C-clamp frames 28 (on both sides of jet pump inlet mixer compliant stop 20) to offer both vertical and horizontal stabilization of main body 22 within pocket 16 (see pocket 16, in FIG. 3) when field installed.

C-clamp body 34 may slide in and out of C-clamp frame 28, via the use of the male dovetail slot portion 34*a* (which engages female dovetail slot portion 28*e*, in FIG. 14A), to allow C-clamp frame 28 and C-clamp body 34 to be fashioned to restrainer bracket 10 (see the installed jet pump inlet mixer compliant stop, in FIG. 5). An upward projecting portion 34*c* and an arced portion 34*b* of the C-clamp body may be provided to allow the C-clamp body 34 to cradle a bottom portion of restrainer bracket 10, to securely fasten both the C-clamp frame 28 and C-clamp body 34 to the restrainer bracket. Socket head cap screw 36 may penetrate both C-clamp frame 28 and C-clamp body 34, allowing the position of C-clamp body 34 to be locked into place within frame 28. Ratchet teeth 36*b* on cap screw 36 and ratchet keeper 36*a* may be used for anti-rotational purposes, to lock cap screw 36 into place once a desired position of C-clamp body 34 has been determined.

Figure 14A:
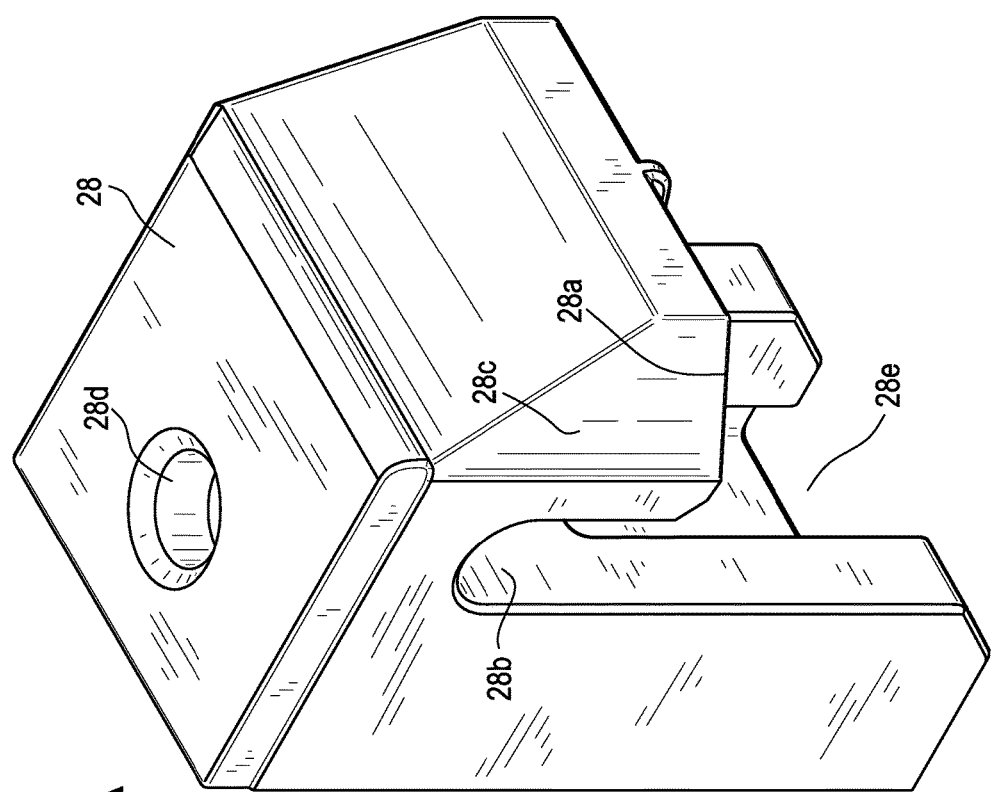
FIG. 14A is a detailed view of the C-clamp frame (shown in FIG. 14) of a jet pump inlet mixer compliant stop, in accordance with an example embodiment of the invention.

FIG. 14A is a detailed view of the C-clamp frame 28 (shown in FIG. 14) of a jet pump inlet mixer compliant stop 20, in accordance with an example embodiment of the invention. Thru hole 28*d* may be provided to accept cap screw 36 (shown in FIG. 14). Female dovetail slot 28*e* may be provided, to engage male dovetail slot 34*a* of C-clamp frame 28 (shown in FIG. 14), allowing C-clamp body 34 of the C-clamp to slide in and out of C-clamp frame 28. The upper portion of hole 28*d* may be tapped to accept ratchet keeper 36*a*.

Figure 14B:
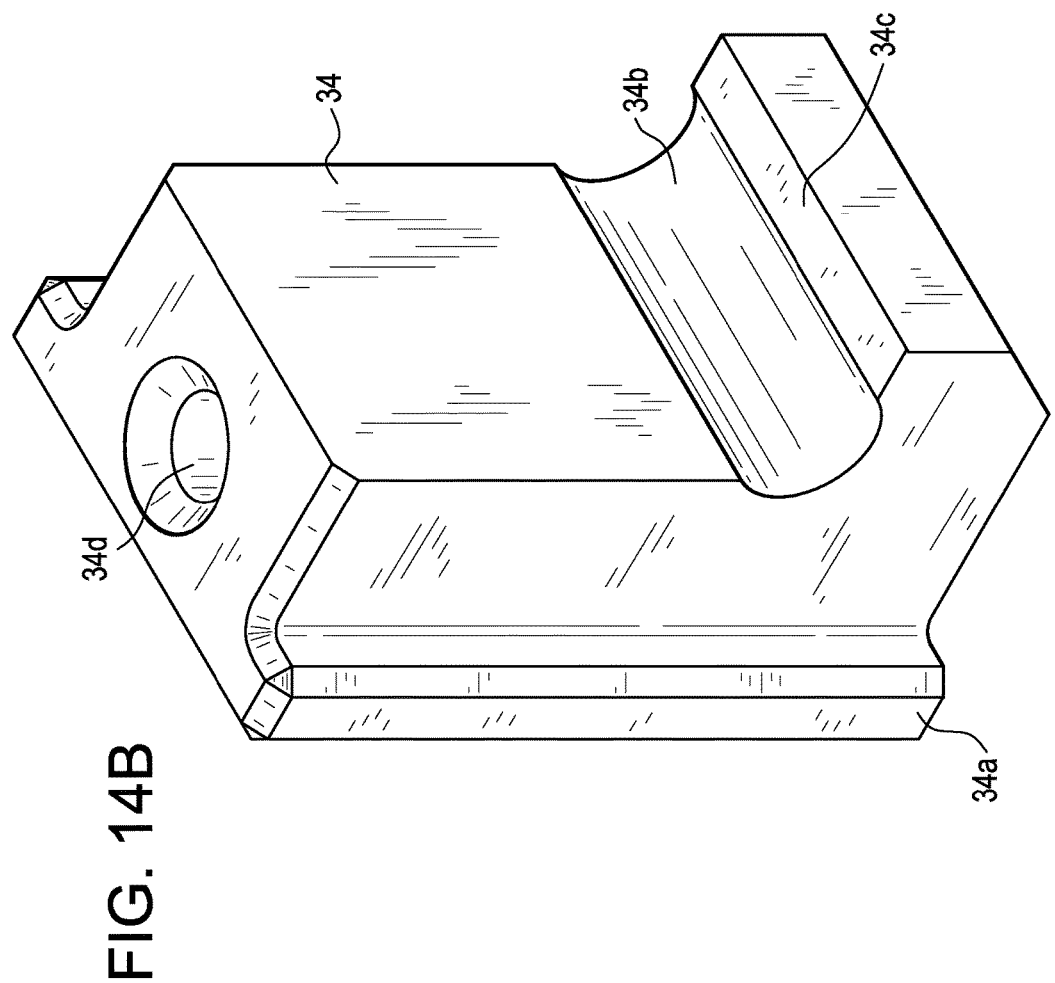
FIG. 14B is a detailed view of a C-clamp body (shown in FIG. 14) of a jet pump inlet mixer compliant stop, in accordance with an example embodiment of the invention.

FIG. 14B is a detailed view of a C-clamp body 34 (shown in FIG. 14) of a jet pump inlet mixer compliant stop 20, in accordance with an example embodiment of the invention. Tapped hole 34*d* may be provided to accept cap screw 36 (shown in FIG. 14). FIG. 14B shows more detail of male dovetail slot 34*a* which may engage the female dovetail slot 28*e* of FIG. 14A, allowing C-clamp body to slide in and out of C-clamp frame 28, as shown in FIG. 14.

Figure 15:
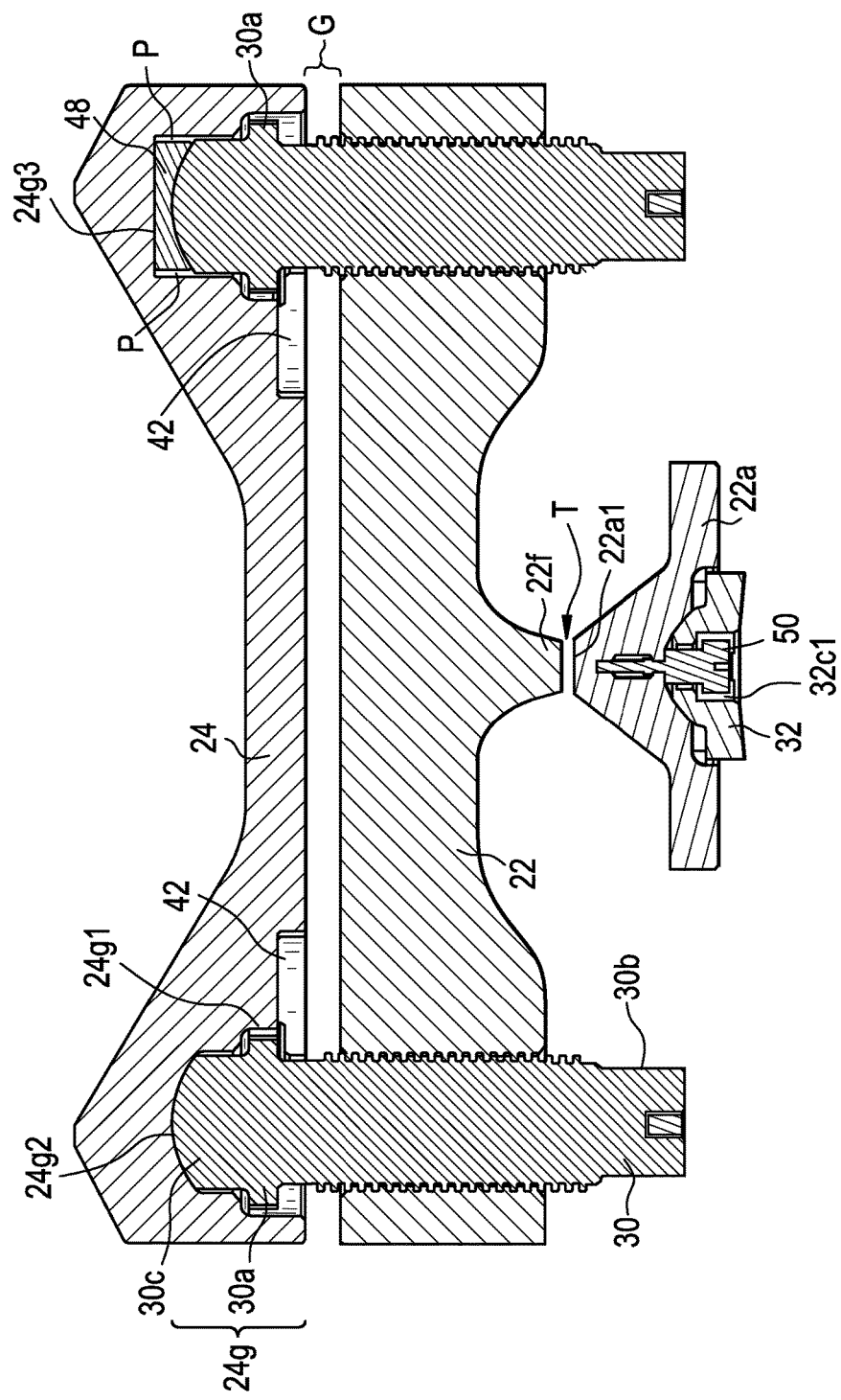
FIG. 15 is a cut-away view of a jet pump inlet mixer compliant stop, in accordance with an example embodiment of the invention.

FIG. 15 is a cut-away view of a jet pump inlet mixer compliant stop 20, in accordance with an example embodiment of the invention. This cut-away view shows a gap T between protruding boss 22*f* (located on a front surface of main body 22) and protruding boss 22*a*1 (located on an inner surface of the distal end of cold spring 22a). When installing compliant stop 30, jacking bolts 30 may be tightened to increase the gap G between foot 24 and main body 22, placing compression on cold spring 22a as swivel contact pad 32 presses against inlet mixer 2 (as shown in FIG. 5A). Therefore, as jacking bolts 30 are tightened, gap T decreases (as gap G increases). During initial installation of the compliant stop 20 (at temperatures that are below jet pump assembly normal operating temperatures), gap T should be approximately zero, or close to zero (for instance, gap T could be 0.1 inches, or it could be less). With a gap T of zero, or near zero, selection of the width and thickness of the cold spring 22a may ensure that cold spring 22a provides a preload (i.e., "spring load") that counteracts flow induced vibration (FIV) that may occur at the inlet mixer. For instance, the preload of the cold spring 22a may be in the range of 2,000 to 4,000 lbs. The actual preload of spring 22a may be sized based on FIV loads that may be plant specific. By selecting a wider spring 22a (with a higher relative spring rate), a higher preload (and, a higher lateral force, during operation) may be imparted by the spring 22a. By selecting a narrower spring (with a lower relative spring rate), a lower preload (and, a lower lateral force, during operation) may be imparted by the spring 22a. Therefore, by selecting a cold spring 22a that may provide a desired preload force (and, assuming that gap T is at zero, or near zero, during initial operation), a precise lateral force may ultimately be imparted on the inlet mixer 2 by the compliant stop 20.

As compliant stop 20 becomes warmer, during normal plant operation (and during warming of the jet pump assembly, which occurs during normal plant operation), thermal expansion of the compliant stop 20 may cause gap T to increase slightly (a more detailed discussion of the materials of construction of component parts, and the associated thermal expansion of these parts, is included herein). The existence of the small gap T (which may be 3/1000 of an inch) may allow cold spring 22a to act as a moderate shock absorber, during heavy system vibration. The existence of the small gap T may also allow protruding bosses 22f and 22a1 to slightly shift in a horizontal direction during system vibration.

The jacking bolt retention holes 24g (shown also in FIG. 11A) may differ, from the standpoint that a spherical backstop 24g2 may be provided for one retention holes 24g, while a flat backstop 24g3 may be provided for another retention hole 24g. The shape of the spherical backstop 24g2 matches the shape of a distal end of the jacking bolt 30, allowing the distal end of jacking bolt 30 to mate with the spherical backstop 24g2. Use of the spherical backstop 24g2 and flat backstop 24g3 may mitigate potential binding, while torque is applied to the jacking bolts 30. Specifically, spherical pad 48 may fit against flat backstop 24g3, with small gaps P on either lateral side of pad 48 (i.e., the diameter of the pad 48 is smaller than the diameter of retention hole 24g). The spherical surface of pad 48 also matches a distal end of jacking bolt 30, allowing the spherical pad 48 to mate with the distal end of jacking bolt 30. As uneven torque may be applied to each jacking bolt 30, the distal end 30c of the jacking bolt 30 on the right side of FIG. 15 may pivot slightly within jacking bolt retention hole 24g, causing spherical pad 48 to slightly shift along the flat backstop 24g3 of the retention hole 24g (shifting of pad 48 may occur, due to the existence of gaps P on either side of pad 48). In this sense, potential binding due to uneven torque between the two jacking bolts 30 may be avoided. It should also be understood that the spherical backstop 24g2 and the spherical pad 48 helps mitigate or eliminate bolt 30 bending, during installation and operation.

FIG. 15 also depicts placement of bolt keeper 42 within foot 24. Bolt keeper 42 acts as a physical stop (by abutting ratchet teeth 30a of jacking bolts 30) to ensure that a distal end 30c of the jacking bolts 30 may remain inside retention hole 24g. As described above, the distal end 30c is free to rotate within retention holes 24g. Therefore, as jacking bolts 30 are tightened, the distal end 30c of each jacking bolt 30 remains in place within retention holes 24g while the threads of each jacking bolt 30 cause main body 22 to be forced apart from foot 24 (thereby increasing the size of gap G, and ultimately decreasing the size of gap T as swivel contact pad 32 is pressed against inlet mixer 2, as shown in FIG. 5A).

Materials of construction of the component parts of the jet pump inlet mixer compliant stop 20 (with the exception of cold spring 22a) and non-compliant stops 38 may be either 300 series stainless steel or type XM-19 stainless steel. More specifically, all components parts of the jet pump inlet mixer compliant stop 20 (with the exception of cold spring 22a) and non-compliant stops 38 may match the materials of construction of existing restrainer bracket assembly components such as the main wedge 8 and the restrainer bracket 10 (which, often are 300 series stainless steel or XM-19). This ensures that potential thermal expansion of the jet pump inlet mixer compliant stop 20 and non-compliant stops 38 match, to some degree, the thermal expansion of existing restrainer bracket assembly components. However, materials of construction for cold spring 22a are preferably alloy X-750, or another suitable high-yield and high-temperature spring material that may expand less than either 300 series stainless steel or XM-19. The lower thermal expansion of cold spring 22a causes a small gap T (see FIG. 15) between preload limit bosses 22a1/22f. The small gap T allows the spring 22a to function (move) during operation, as described above.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed:

1. A Boiling Water Reactor (BWR) jet pump inlet mixer compliant stop, comprising:
    a main body with a first longitudinal length in a first direction, the main body including opposing front and rear surfaces running along the first longitudinal length of the main body;
    a foot extending longitudinally along the rear surface of the main body;
    a spring attached to the main body and projecting beyond the front surface of the main body in a second direction that is about perpendicular to the first longitudinal length of the main body; and
    at least one jacking bolt connecting the main body to the foot, a second longitudinal length of the at least one jacking bolt being about parallel to the second direction, wherein the at least one jacking bolt is configured to be tightened to compress the spring to cause the spring to impart a controlled lateral force in the second direction during installation of the compliant stop between two stationary opposing surfaces.

2. The compliant stop of claim 1, wherein,
the spring is located near a mid-section of the main body,
the at least one jacking bolt includes a first jacking bolt and a second jacking bolt, the first and second jacking bolts are located on either side of the spring.

3. The compliant stop of claim 2, wherein
a front surface of the foot defines a first and second jacking bolt retention hole configured to retain a distal end of a jacking bolt; and
a first and second threaded hole in the main body, each threaded hole configured to engage threads on each jacking bolt to cause the main body to separate from the foot as the jacking bolts are tightened.

4. The compliant stop of claim 3, further comprising:
a first protruding boss on the front surface of the main body; and
a second protruding boss on an inner surface of a distal end of the spring, the first and second protruding bosses directly opposing each other to define a gap between the bosses.

5. The compliant stop of claim 3, further comprising:
a concave spherical seat on an outer surface of a distal end of the spring;
a swivel contact pad with a concave cylindrical outer surface, the swivel contact pad having an inner convex spherical face configured to mate with the concave spherical seat; and
self-alignment ribs extending from the inner convex spherical face of the swivel contact pad, the self-alignment ribs insertable into alignment channels on the outer surface of the distal end of the spring.

6. The compliant stop of claim 3, further comprising:
a first and second bolt keeper attached to the front surface of the foot, each bolt keeper located near a respective jacking bolt retention hole,
wherein each bolt keeper is configured to contact an edge of the respective jacking bolt to allow the distal end of the jacking bolt to freely rotate within the jacking bolt retention hole.

7. The compliant stop of claim 3, further comprising:
a ratchet keeper with two ends, the ratchet keeper attached longitudinally across a top surface of the foot;
ratchet teeth on each end of the ratchet keeper; and
a first and second ratchet tooth slot located in the foot and above each jacking bolt retention hole,
wherein each ratchet tooth slot is configured to accept respective ratchet teeth of the ratchet keeper, allowing the ratchet teeth to contact a respective jacking bolt to lock the respective jacking bolt into a desired position within the foot.

8. The compliant stop of claim 3, further comprising:
a c-clamp on each of two lateral sides of the foot and the main body, each c-clamp including,
a c-clamp frame with a vertical downwardly projecting overhang, the overhang having a sloped face configured to mate with sloped faces on the two lateral sides of the foot and the main body,
a c-clamp body with a vertical upwardly projecting upward portion, the c-clamp body configured to slide in and out of the c-clamp frame,
a cap screw configured to lock the c-clamp body into a desired position within the c-clamp frame.

9. The compliant stop of claim 3, further comprising:
a spherical shaped backstop at an end of the first jacking bolt retention hole, the spherical shape of the backstop capable of mating with a shape of the distal end of the first jacking bolt;
a flat shaped backstop at an end of the second jacking bolt retention hole; and
a pad located at the end of the second jacking bolt retention hole, the pad having a first and a second side, the first side being flat and the second side being spherical in shape, the spherical shape of the second side capable of mating with a shape of the distal end of the second jacking bolt,
wherein a diameter of the pad is smaller than a diameter of the second jacking bolt retention hole.

10. The compliant stop of claim 2, wherein the spring is made from a material that experiences less thermal expansion than materials used to make the main body, the foot and the jacking bolts.

11. The compliant stop of claim 4, wherein the compliant stop is configured to allow the at least one jacking bolt to be tightened to force the main body and the foot to separate while causing the gap between the first and second protruding bosses to decrease during installation of the compliant stop.

* * * * *